US010863093B2

(12) United States Patent
Fukushima et al.

(10) Patent No.: US 10,863,093 B2
(45) Date of Patent: Dec. 8, 2020

(54) IMAGE SHAKE CORRECTION DEVICE AND IMAGING DEVICE

(71) Applicant: FUJIFILM Corporation, Tokyo (JP)

(72) Inventors: Hajime Fukushima, Saitama (JP); Shinji Otsuka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/912,683

(22) Filed: Jun. 25, 2020

(65) Prior Publication Data

US 2020/0329185 A1 Oct. 15, 2020

Related U.S. Application Data

(63) Continuation of application No. PCT/JP2018/048302, filed on Dec. 27, 2018.

(30) Foreign Application Priority Data

Dec. 28, 2017 (JP) ................. 2017-254241

(51) Int. Cl.
*H04N 5/232* (2006.01)

(52) U.S. Cl.
CPC ....... *H04N 5/2328* (2013.01); *H04N 5/23258* (2013.01)

(58) Field of Classification Search
CPC .......................... H04N 5/2328; H04N 5/23258
See application file for complete search history.

(56) References Cited

U.S. PATENT DOCUMENTS

| 2006/0115258 | A1* | 6/2006 | Nomura | H04N 5/2253 396/55 |
| 2006/0164516 | A1* | 7/2006 | Kurosawa | H04N 5/23248 348/208.99 |
| 2008/0225126 | A1* | 9/2008 | Mogamiya | H04N 5/2253 348/208.4 |

(Continued)

FOREIGN PATENT DOCUMENTS

| JP | 2006-203624 A | 8/2006 |
| JP | 2007-164000 A | 6/2007 |

(Continued)

OTHER PUBLICATIONS

International Search Report issued in PCT/JP2018/048302; dated Feb. 5, 2019.
Written Opinion issued in PCT/JP2018/048302; dated Feb. 5, 2019.

*Primary Examiner* — Abdelaaziz Tissire
*Assistant Examiner* — John H Morehead, III
(74) *Attorney, Agent, or Firm* — Studebaker & Brackett PC

(57) ABSTRACT

An image shake correction device (3) includes a movable member (2), a support member (1) including a movement prevention member (1B, 1C) for preventing the movable member (2) from being lifted, and a movement restriction unit that restricts a movement range of the movable member (2). The movement restriction unit includes a hole portion (11a) formed in the support member (1) and an insertion member (28a) inserted into the hole portion (11a) formed in the movable member (2). The insertion member (28a) has an abutting portion (283a) that moves in the hole portion (11a) in directions X, Y, and θ with the movement of the movable member (2), and a wide width portion (281a) which is wider than the abutting portion (283a).

14 Claims, 16 Drawing Sheets

(56) References Cited

U.S. PATENT DOCUMENTS

| | | | | |
|---|---|---|---|---|
| 2009/0052037 A1* | 2/2009 | Wernersson | ............ | H04N 5/232 |
| | | | | 359/554 |
| 2013/0188066 A1 | 7/2013 | Suzuka | | |
| 2016/0116758 A1* | 4/2016 | Nomura | ................. | G02B 7/023 |
| | | | | 359/557 |
| 2020/0228711 A1* | 7/2020 | Awazu | ................... | H04N 5/225 |

FOREIGN PATENT DOCUMENTS

| | | |
|---|---|---|
| JP | 2008-225135 A | 9/2008 |
| JP | 2010-096826 A | 4/2010 |
| JP | 2013-148733 A | 8/2013 |
| JP | 2015-148753 A | 8/2015 |
| JP | 2016-151647 A | 8/2016 |

\* cited by examiner

IMAGE SHAKE CORRECTION DEVICE AND IMAGING DEVICE

CROSS REFERENCE TO RELATED APPLICATION

This is a continuation of International Application No. PCT/JP2018/048302 filed on Dec. 27, 2018, and claims priority from Japanese Patent Application No. 2017-254241 filed on Dec. 28, 2017, the entire disclosures of which are incorporated herein by reference.

BACKGROUND OF THE INVENTION

1. Field of the Invention

The present invention relates to an image shake correction device and an imaging device.

2. Description of the Related Art

An imaging device comprising an imaging element that images a subject through an imaging optical system or a lens device used by being attached to the imaging device has an image shake correction function of correcting shake (hereinafter, referred to as image shake) of a captured image caused by vibration of the apparatus.

For example, in the lens device, image shake correction is performed by moving a correction lens included in an imaging optical system in a surface perpendicular to an optical axis such that the vibration of the apparatus is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imaging element on a surface perpendicular to an optical axis such that the vibration of the apparatus is detected based on information from a motion detection sensor such as an acceleration sensor or an angular velocity sensor mounted on the imaging device and the detected vibration is canceled.

JP2010-096826A to JP2006-203624A describe an image shake correction device that performs image shake correction by moving an imaging element.

SUMMARY OF THE INVENTION

In the image shake correction device, a pressing member for pressing a movable member to a fixed member side is attached to a fixed member that supports the movable member from a rear surface side from a front surface side of the movable member in order to prevent the movable member from being lifted in a direction perpendicular to a movement plane of the movable member (see JP2010-096826A and JP2008-225135).

In order to achieve weight reduction of the image shake correction device, it is effective to reduce an installation area of the pressing member. However, in a case where the installation area of the pressing member is excessively reduced, it is not possible to prevent the movable member from being lifted. Thus, it is difficult to achieve both the size reduction and weight reduction by reducing the number of pressing members and prevention of the movable member from being lifted.

JP2010-096826A and JP2008-225135 do not consider reducing the number of pressing members.

The image shake correction device described in JP2006-203624A prevents a movable member from being lifted by hooking a large-diameter portion of an engagement pin formed on the movable member to a periphery of an engagement window provided on a fixed member without including the pressing member. However, in this image shake correction device, friction between the engagement pin and an inner surface of the engagement window and friction between the large-diameter portion of the engagement pin and the hooking portion of the fixed member constantly occur with the movement of the movable member. Thus, the responsiveness of the driving is reduced, and a power required for the driving is increased.

The present invention has been made in view of the aforementioned circumstances, and an object of the present invention is to provide an image shake correction device capable of preventing a movable member from being lifted while realizing weight reduction, size reduction, and improvement in responsiveness, and an imaging device including the same.

There is provided an image shake correction device comprising a movable member to which an imaging element is fixed, a support member that supports the movable member in a manner where the movable member is movable in a plurality of directions including a first direction and a second direction perpendicular to each other along a light receiving surface of the imaging element, and a movement restriction unit that restricts a movement range of the movable member. The support member comprises a main body disposed on a side opposite to the light receiving surface side of the movable member, and a movement prevention member which has a portion which is fixed to the main body to interpose the movable member in cooperation with the main body and prevents movement of the movable member in a direction perpendicular to the light receiving surface by the portion, the movement restriction unit includes a hole portion which is formed at one of the movable member and the support member, and an insertion member which is formed at the other one of the movable member and the support member and is inserted into the hole portion, and the insertion member comprises an abutting portion which is located in the hole portion and is capable of entering a state in which the insertion member abuts on an inner surface of the hole portion and a state in which the insertion member does not abut on the inner surface by moving in the hole portion in the plurality of directions with the movement of the movable member, and a wide width portion which is disposed outside the hole portion on a side opposite to the other member side on which the insertion member is formed and of which a width in at least one direction along the light receiving surface is wider than the abutting portion, and the width of the wide width portion is narrower than a width of the hole portion in the at least one direction.

An imaging device of the present invention comprises the image shake correction device.

According to the present invention, it is possible to provide an image shake correction device capable of preventing a movable member from being lifted while realizing weight reduction and size reduction, and an imaging device including the same.

DESCRIPTION OF THE PREFERRED EMBODIMENTS

Hereinafter, embodiments of the present invention will be described with reference to the drawings.

Figure 1:
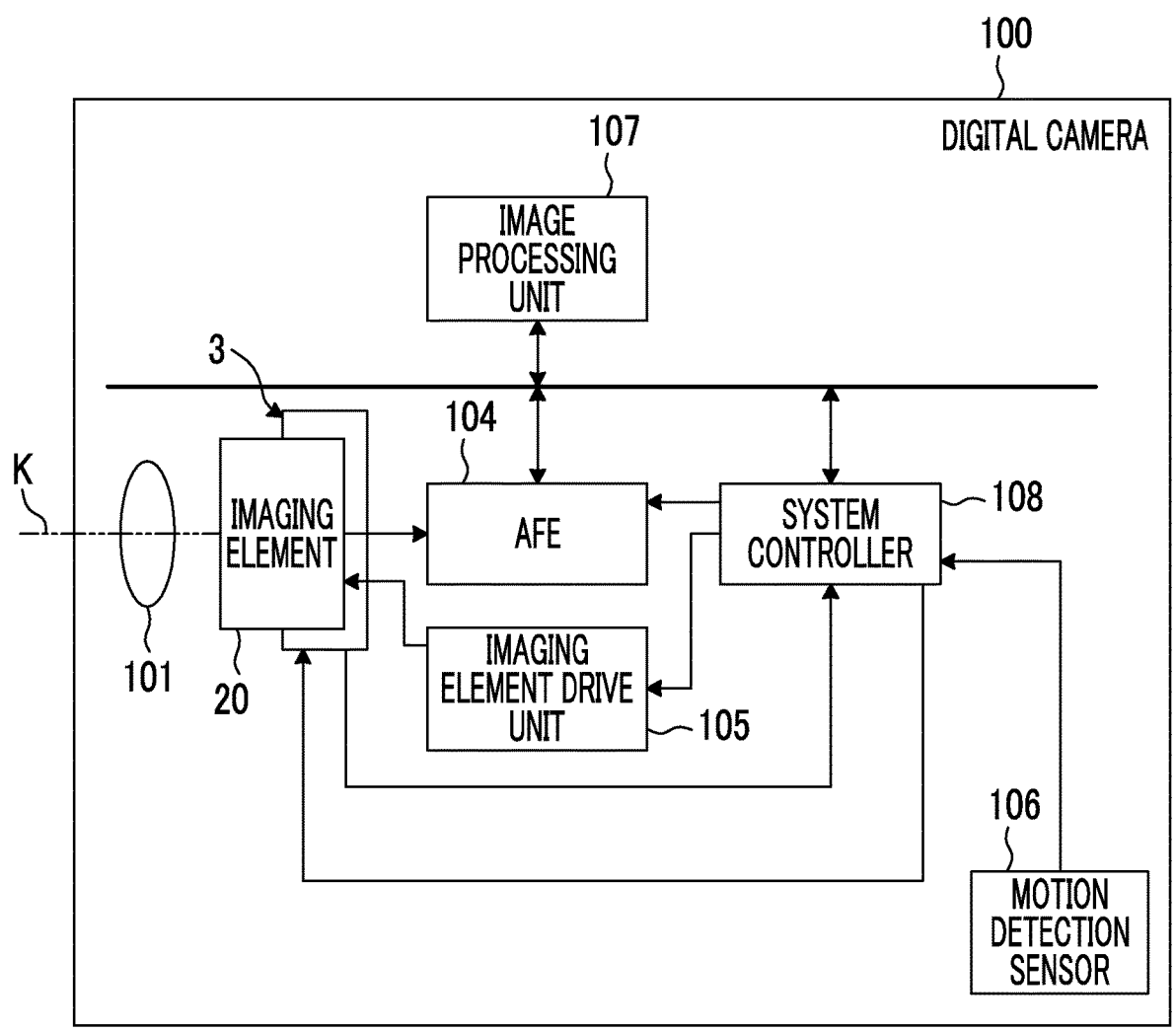
FIG. 1 is a diagram showing a schematic configuration of a digital camera 100 which is an embodiment of an imaging device of the present invention.

FIG. 1 is a diagram showing a schematic configuration of a digital camera 100 which is an embodiment of an imaging device of the present invention.

The digital camera 100 comprises an imaging optical system 101, an imaging element 20, an image shake correction device 3, an imaging element drive unit 105 that drives the imaging element 20, an analog front end (AFE) 104, an image processing unit 107, a motion detection sensor 106, and a system controller 108 that performs overall control of the entire digital camera 100.

The imaging optical system 101 includes an imaging lens such as a focus lens or a zoom lens, and a stop.

The imaging element 20 images a subject through the imaging optical system 101, and comprises a semiconductor chip on which a charge coupled device (CCD) image sensor or a complementary metal oxide semiconductor (CMOS) image sensor is formed and a package that accommodates the semiconductor chip.

Figure 3:
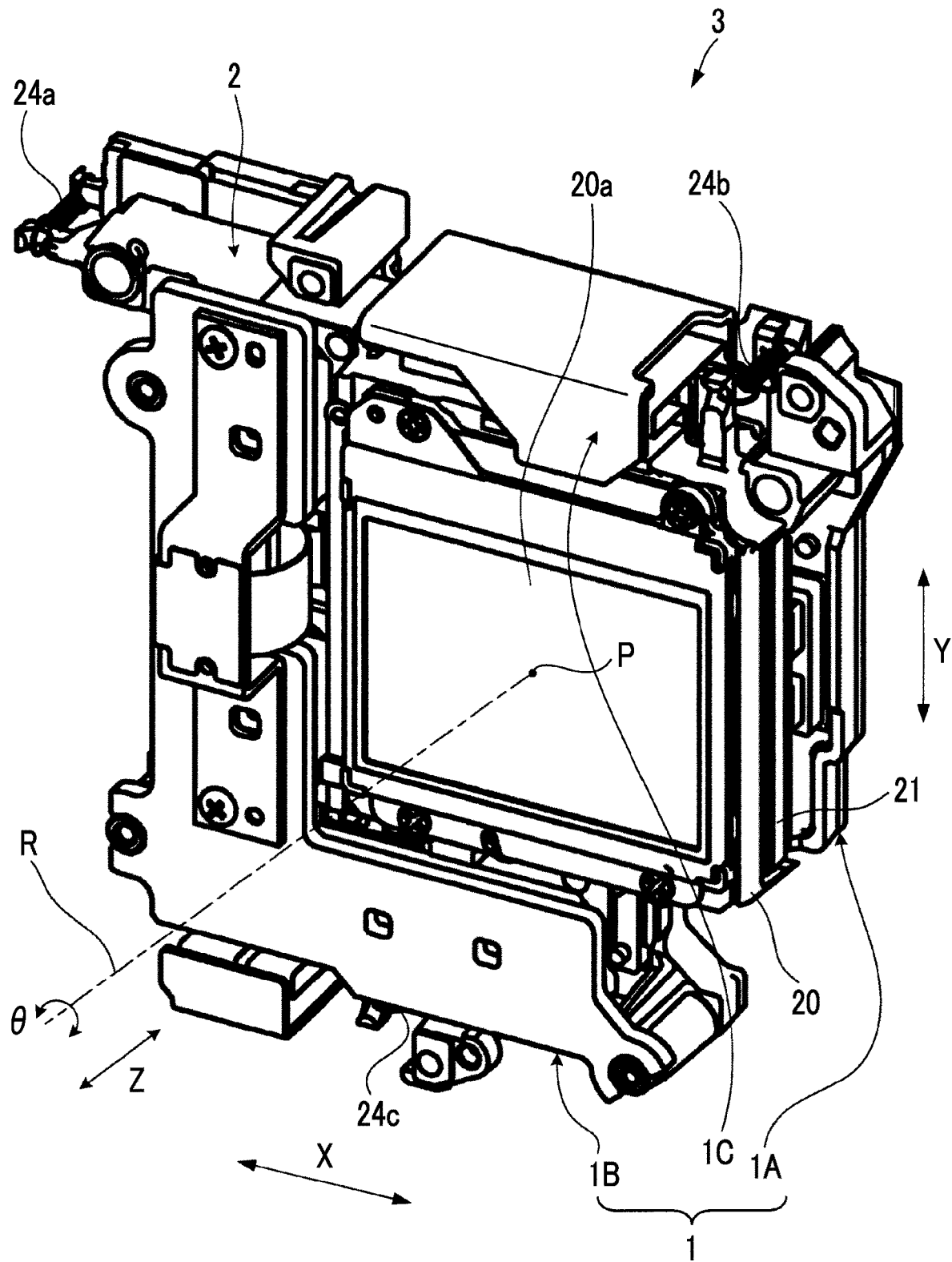
FIG. 3 is a perspective view showing an appearance configuration of the image shake correction device 3 shown in FIGS. 1 and 2.

As shown in FIG. 3 to be described below, a light receiving surface 20a of the imaging element 20 has a rectangular shape.

The image shake correction device 3 corrects image shake of a captured image captured by the imaging element 20 by moving the light receiving surface 20a of the imaging element 20 within a surface perpendicular to an optical axis K of the imaging optical system 101.

In the present specification, in the digital camera 100, a state in which the light receiving surface 20a of the imaging element 20 is perpendicular to a gravity direction (a state in which the optical axis K is parallel to the gravity direction), and a state in which the image shake correction device 3 is not energized are referred to as a reference state. In this reference state, a center P (see FIG. 3) of the light receiving surface 20a is located on the optical axis K.

Although the detailed configuration of the image shake correction device 3 will be described below, the image shake is corrected by moving the imaging element 20 in three directions of a second direction which is a longitudinal direction (direction X shown in FIG. 3) of the light receiving surface 20a of the imaging element 20 in the reference state, a first direction which is a lateral direction (direction Y shown in FIG. 3) of the light receiving surface 20a of the imaging element 20 in the reference state, and a third direction which is a rotation direction (direction θ shown in FIG. 3) using the center P of the light receiving surface 20a of the imaging element 20 in this reference state as a center.

The AFE 104 includes a signal processing circuit that performs correlative double sampling processing and digital conversion processing on imaging signals output from the imaging element 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imaging element drive unit 105 and the AFE 104 such that the subject is captured by the imaging element 20 and the imaging signal corresponding to a subject image is output from the imaging element 20.

The system controller 108 controls the image shake correction device 3 based on movement information of the digital camera 100 detected by the motion detection sensor 106.

The system controller 108 corrects the image shake of the captured image captured by the imaging element 20 by moving the light receiving surface 20a of the imaging element 20 in at least one of the direction X, the direction Y, or the direction θ.

In a state in which the image shake correction device 3 is energized, in a case where the movement of the digital camera 100 is not detected by the motion detection sensor 106, the system controller 108 controls the image shake correction device 3 such that a position of the light receiving surface 20a of the imaging element 20 is a position in the reference state.

Figure 2:
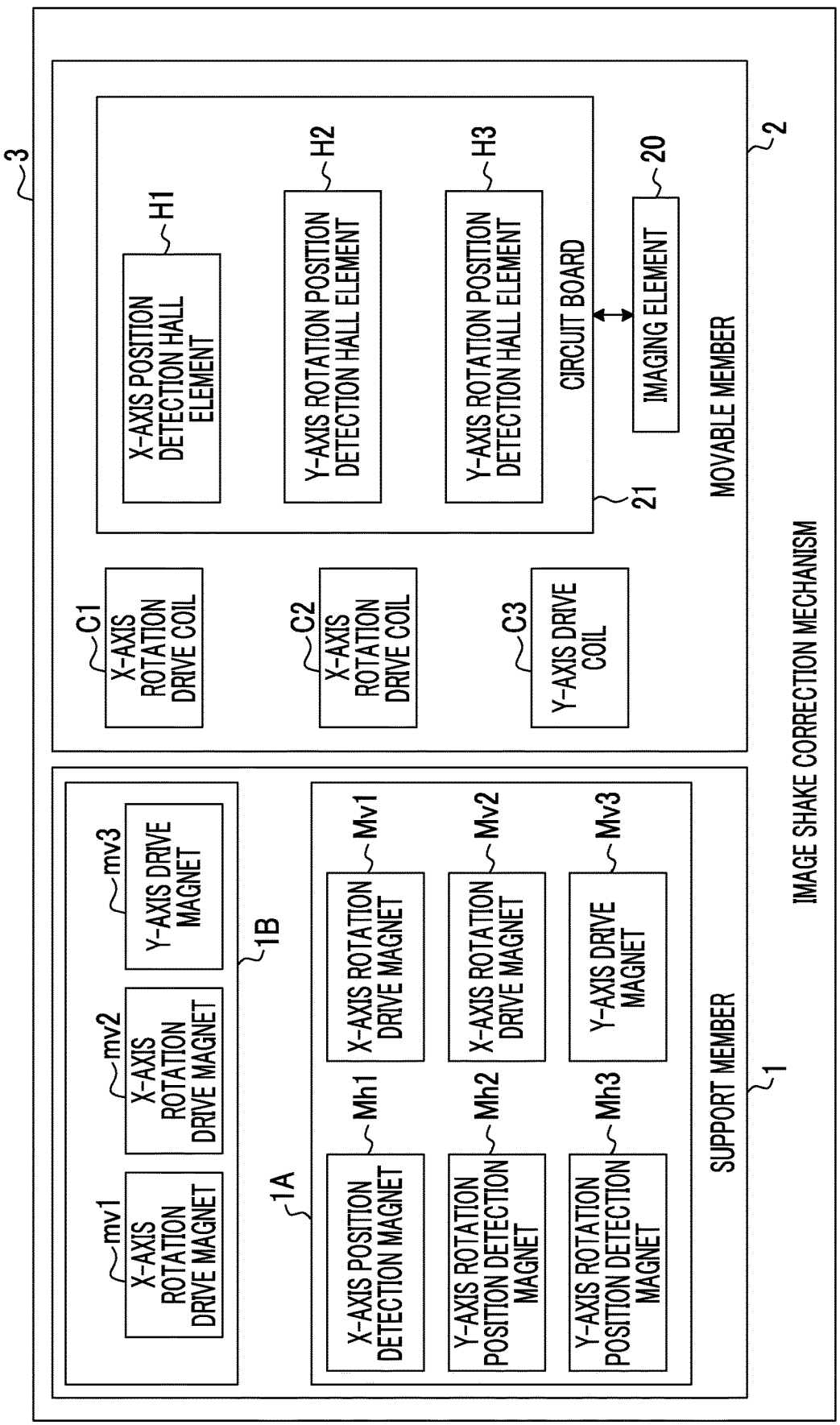
FIG. 2 is a diagram showing a schematic configuration of an image shake correction device 3 in the digital camera 100 shown in FIG. 1.

FIG. 2 is a diagram showing a schematic configuration of the image shake correction device 3 in the digital camera 100 shown in FIG. 1.

The image shake correction device 3 comprises a movable member 2 movable in each of the directions X, Y, and θ, and a support member 1 that supports the movable member 2 to be movable in each of the directions X, Y, and θ.

A circuit board 21 on which the imaging element 20 is fixed (mounted), an X-axis rotation drive coil C1, an X-axis rotation drive coil C2, and a Y-axis drive coil C3 are fixed to the movable member 2.

An X-axis position detection Hall element H1 that is a position detection element for detecting a position of the movable member 2 in the direction X, and a Y-axis rotation position detection Hall element H2 and a Y-axis rotation position detection Hall element H3 which are position detection elements for detecting positions of the movable member 2 in the direction Y and the direction θ are fixed to the circuit board 21.

Hereinafter, the X-axis position detection Hall element H1, the Y-axis rotation position detection Hall element H2, and the Y-axis rotation position detection Hall element H3 are collectively and simply referred to as position detection elements.

Output signals of the X-axis position detection Hall element H1, the Y-axis rotation position detection Hall element H2, and the Y-axis rotation position detection Hall element H3 are input to the system controller 108.

The system controller 108 moves the movable member 2 by controlling a control current flowing through the X-axis rotation drive coil C1, a control current flowing through the X-axis rotation drive coil C2, and a control current flowing through the Y-axis drive coil C3 based on the output signals, and corrects the image shake.

The support member 1 includes a main body 1A, a pressing member 1B, and a pressing member 1C to be described below (see FIG. 3).

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the main body 1A.

Hereinafter, the X-axis position detection magnet Mh1, the Y-axis rotation position detection magnet Mh2, and the Y-axis rotation position detection magnet Mh3 may be collectively and simply referred to as the position detection magnets.

The X-axis rotation drive magnet mv1, the X-axis rotation drive magnet mv2, and the Y-axis drive magnet mv3 are fixed to the pressing member 1B.

FIG. 3 is a perspective view showing an appearance configuration of the image shake correction device 3 shown in FIGS. 1 and 2. FIG. 3 shows an appearance of the image shake correction device 3 in the reference state.

As shown in FIG. 3, the image shake correction device 3 comprises the support member 1 constituted by the main body 1A, the pressing member 1B, and the pressing member 1C, and the movable member 2 to which the circuit board 21 on which the imaging element 20 is mounted is fixed.

The main body 1A is disposed on a rear surface side of the movable member 2 (on a surface side opposite to the light receiving surface 20a side).

The pressing member 1B is disposed on a front surface side (the light receiving surface 20a side) of the movable member 2, and is fixed to the main body 1A by screwing in a state in which sandwiching the movable member 2 in cooperation with the main body 1A.

The pressing member 1C is fixed to the rear surface of the main body 1A by screwing. A front end portion of the pressing member 1C extends to a position overlapping the movable member 2.

The movable member 2 is interposed between the main body 1A and a part of the pressing member 1B and the pressing member 1C, and is urged against the main body 1A by springs 24a, 24b, and 24c which are elastic members.

The springs 24a, 24b, and 24c may be any springs that can urge the movable member 2 to the main body 1A by an elastic force, and may be replaced with rubber which is an elastic member, for example.

This image shake correction device 3 is fixed to the main body of the digital camera 100 in a state in which the light receiving surface 20a faces the imaging optical system 101 shown in FIG. 1.

The image shake correction device 3 corrects the image shake by moving the movable member 2 in the direction θ around a rotation axis R (an axis which is parallel to the gravity direction and passes through the center P in the reference state) which is perpendicular to the light receiving surface 20a and passes through the center P of the light receiving surface 20a, the direction X which is the longitudinal direction of the light receiving surface 20a, and the direction Y which is the lateral direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ by the same angle.

In the digital camera 100 shown in FIG. 1, a posture in which the direction Y shown in FIG. 3 is parallel to the gravity direction is a normal posture (a posture for performing so-called horizontal photography).

Figure 4:
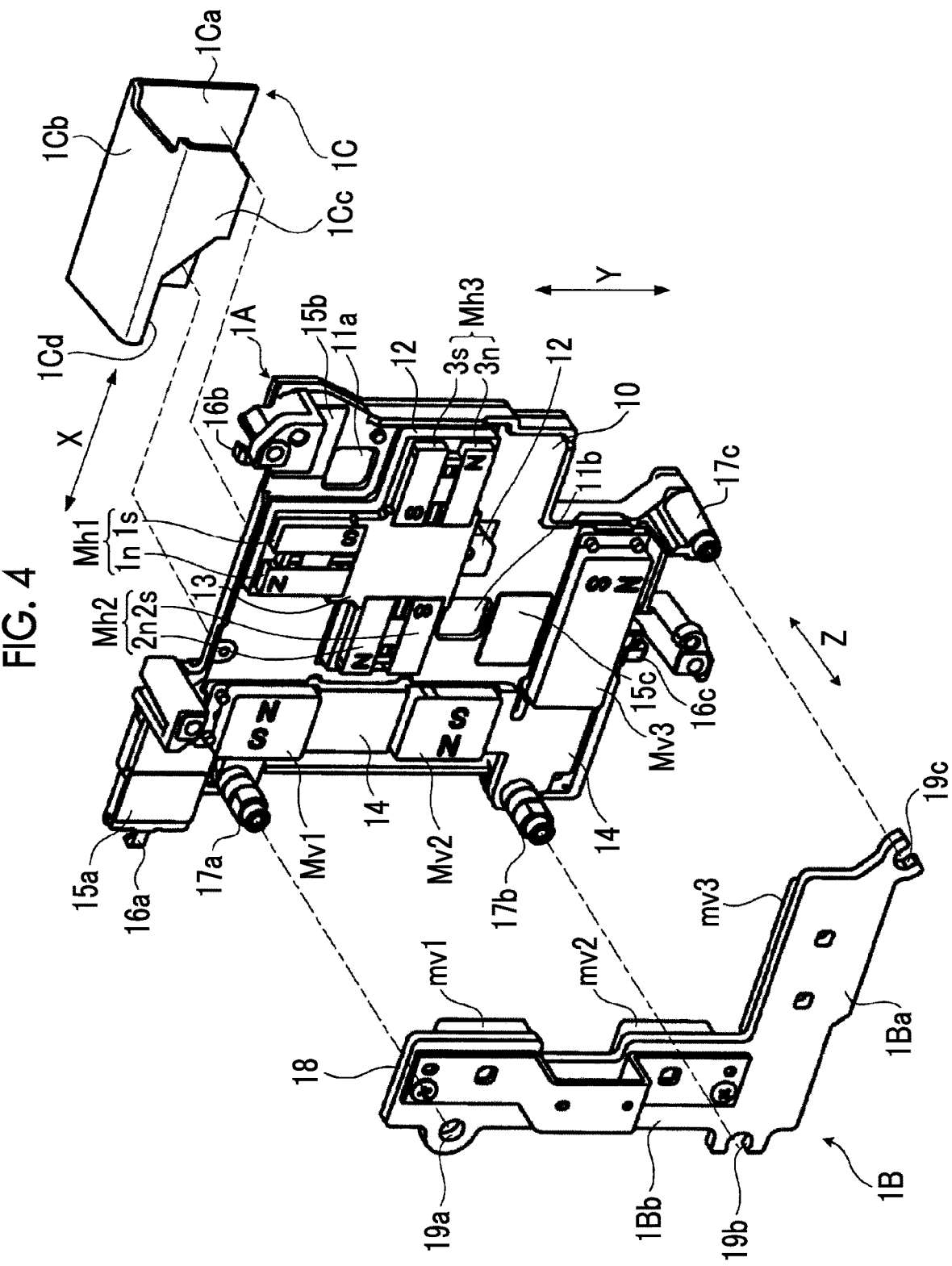
FIG. 4 is an exploded perspective view of a support member 1 in the image shake correction device 3 shown in FIG. 3 is viewed from an imaging optical system 101 side.

FIG. 4 is an exploded perspective view of the support member 1 in the image shake correction device 3 shown in FIG. 3 as viewed from the imaging optical system 101 side.

Figure 5:
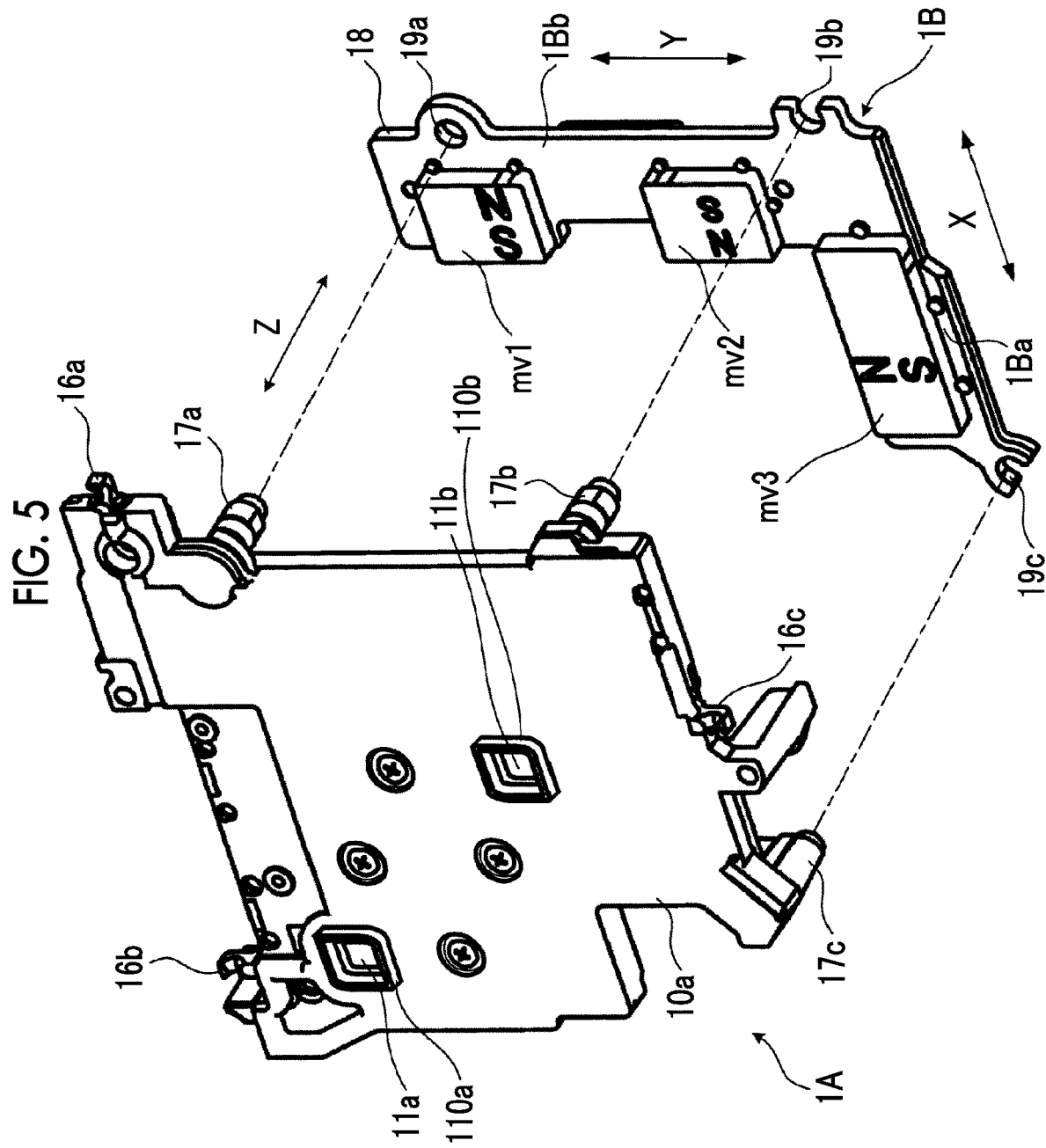
FIG. 5 is an exploded perspective view of the support member 1 shown in FIG. 4 is viewed from a side opposite to the imaging optical system 101 side.

FIG. 5 is an exploded perspective view of the main body 1A and the pressing member 1B of the support member 1 shown in FIG. 4 as viewed from a side opposite to the imaging optical system 101 side.

As shown in FIGS. 4 and 5, the main body 1A comprises a plate-like base 10 that is made of resin and has a flat surface perpendicular to the direction Z, and projecting portions 17a, 17b, and 17c extending in the direction Z from an edge part of the base 10 to the imaging optical system 101 side.

The pressing member 1B has a substantially L-shaped yoke 18 as viewed from the imaging optical system 101 side. The yoke 18 is formed along one of two sides of the light receiving surface 20a extending in the direction X, and includes a first portion 1Ba formed so as to be adjacent to this one side, and a second portion 1Bb which is formed along one side of the light receiving surface 20a extending in the direction Y and is formed so as to be adjacent to this one side.

A hole portion 19a and notch portions 19b and 19c at positions facing the projecting portions 17a, 17b and 17c are formed at the yoke 18.

In a state in which the movable member 2 is disposed between the main body 1A and the pressing member 1B, the projecting portion 17a of the main body 1A is fitted into the hole portion 19a of the pressing member 1B and is fixed by a screw.

In this state, the projecting portion 17b of the main body 1A is fitted and fixed in the notch portion 19b of the pressing member 1B, and the projecting portion 17c of the main body 1A is fitted and fixed in the notch portion 19c of the pressing member 1B.

As shown in FIG. 3, the movable member 2 is urged to the main body 1A by the springs 24a, 24b, and 24c. However, for example, in FIG. 3, in a state in which the light receiving surface 20a is directed to the ground, a force to move to the ground due to gravity acts on the movable member 2. The pressing member 1B interposes the movable member 2 in cooperation with the main body 1A, and accordingly, functions to prevent the movable member 2 from moving in the direction Z to such an extent that a rolling element, to be described below, disposed between the movable member 2 and the main body 1A falls in the direction Z.

As shown in FIG. 4, the pressing member 1C is fixed to the rear surface of the main body 1A, and includes a plate-shaped flat plate portion 1Ca extending from a fixed end to one direction of the direction Y, a plate-shaped flat plate portion 1Cb extending from the flat plate portion 1Ca in the direction Z, and a plate-shaped flat plate portion 1Cc extending from the flat plate portion 1Cb in the other direction of the direction Y.

The flat plate portion 1Cc is formed along the other one of the two sides of the light receiving surface 20a extending in the direction X as viewed from the direction Z, and is formed so as to be adjacent to the other side.

As shown in FIG. 3, a front end portion of the flat plate portion 1Cc is disposed at a position at which the flat plate portion interposes the movable member 2 in cooperation with the main body 1A. The flat plate portion 1Cc of the pressing member 1C interposes the movable member 2 in cooperation with the main body 1A, and thus, the front end portion thereof functions to prevent the movable member 2 from greatly moving in the direction Z due to the above-described gravity (moving to such an extent that the rolling element to be described below falls).

A notch portion 1Cd is formed in the flat plate portion 1Cc, and a plane area thereof is reduced as much as possible such that the light receiving surface 20a is not blocked by the flat plate portion 1Cc with the movement of the movable member 2. That is, in the reference state, an overlapping area between the flat plate portion 1Cc and the movable member 2 is sufficiently smaller than an overlapping area between the first portion 1Ba and the second portion 1Bb and the movable member 2.

In order to achieve the weight reduction of the image shake correction device 3, a width of the flat plate portion 1Cc in the direction Y is reduced to such an extent that the flat plate portion does not have a portion overlapping the movable member 2 as viewed from the direction Z in a state in which the movable member 2 is moved downward in the direction Y by a predetermined amount from the reference state shown in FIG. 3.

That is, the flat plate portion 1Cc functions to prevent the movable member 2 from moving in the direction Z in a state in which the movable member 2 is located at a part of a movable range of the movable member 2. In other words, the flat plate portion 1Cc does not function to prevent the movable member 2 from moving in the direction Z in a state in which the movable member 2 is located in a range other than the aforementioned part of the movable range of the movable member 2.

The pressing member 1B and the pressing member 1C constitute a movement prevention member. The first portion 1Ba of the yoke of the pressing member 1B constitutes a first portion of the movement prevention member. The second portion 1Bb of the yoke of the pressing member 1B constitutes a second portion of the movement prevention member. The flat plate portion 1Cc of the pressing member 1C constitutes a third portion of the movement prevention member.

As shown in FIG. 4, substantially L-shaped yokes 14 as viewed from the imaging optical system 101 side are formed at a left end portion in the direction X and a lower end portion in the direction Y as viewed from the imaging optical system 101 side on a surface of the base 10 on the imaging optical system 101 side.

The X-axis rotation drive magnet Mv1 and the X-axis rotation drive magnet Mv2 are arranged and fixed on a front surface of portions of the yokes 14 of the main body 1A that extends along the direction Y with a space in the direction Y.

As viewed from the imaging optical system 101 side, the X-axis rotation drive magnet Mv1 is disposed such that an N-pole faces the right direction of the direction X and an S-pole faces the left direction of the direction X.

As viewed from the imaging optical system 101 side, the X-axis rotation drive magnet Mv2 is disposed such that an N-pole faces the left direction of the direction X and an S-pole faces the right direction of the direction X.

The Y-axis drive magnet Mv3 is fixed on a front surface of a portion of the yoke 14 of the main body 1A that extends along the direction X.

As viewed from the imaging optical system 101 side, the Y-axis drive magnet Mv3 is disposed such that an N-pole faces the down direction of the direction Y and an S-pole faces the up direction of the direction Y.

Figure 6:
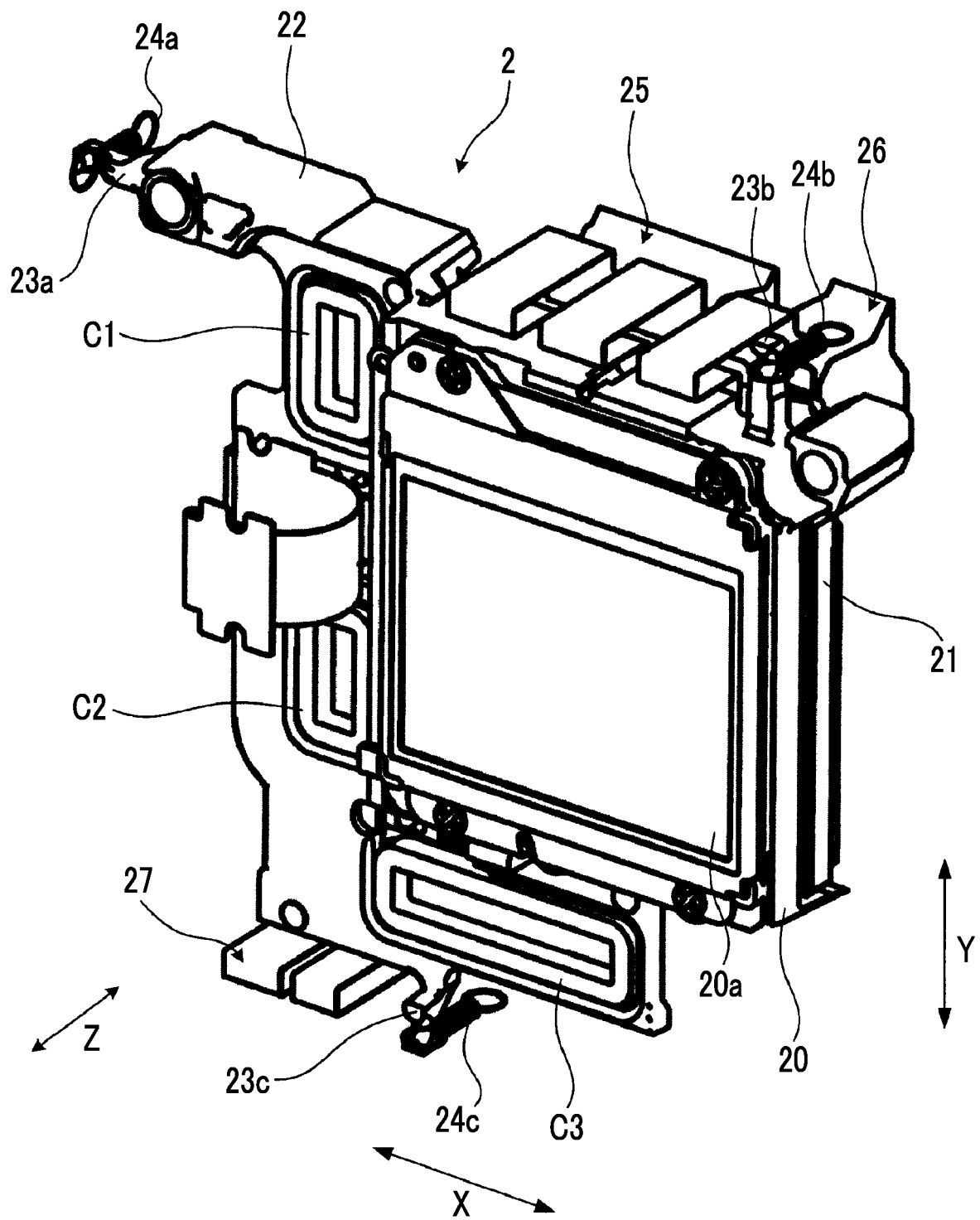
FIG. 6 is a perspective view of a movable member 2 in the image shake correction device 3 shown in FIG. 3 as viewed from the imaging optical system 101 side.
Figure 7:
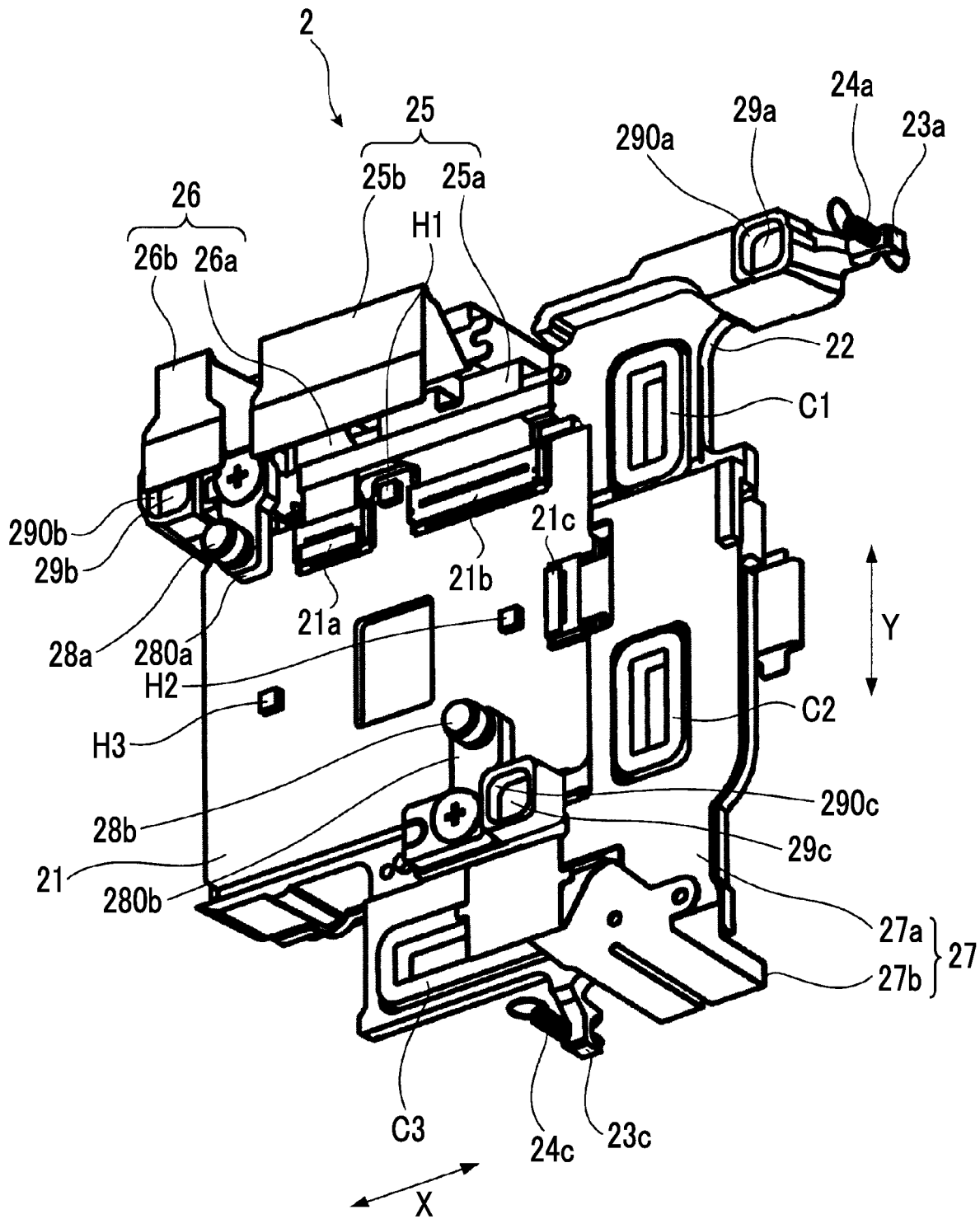
FIG. 7 is a perspective view of the movable member 2 shown in FIG. 6 as viewed from the side opposite to the imaging optical system 101 side.
Figure 8:
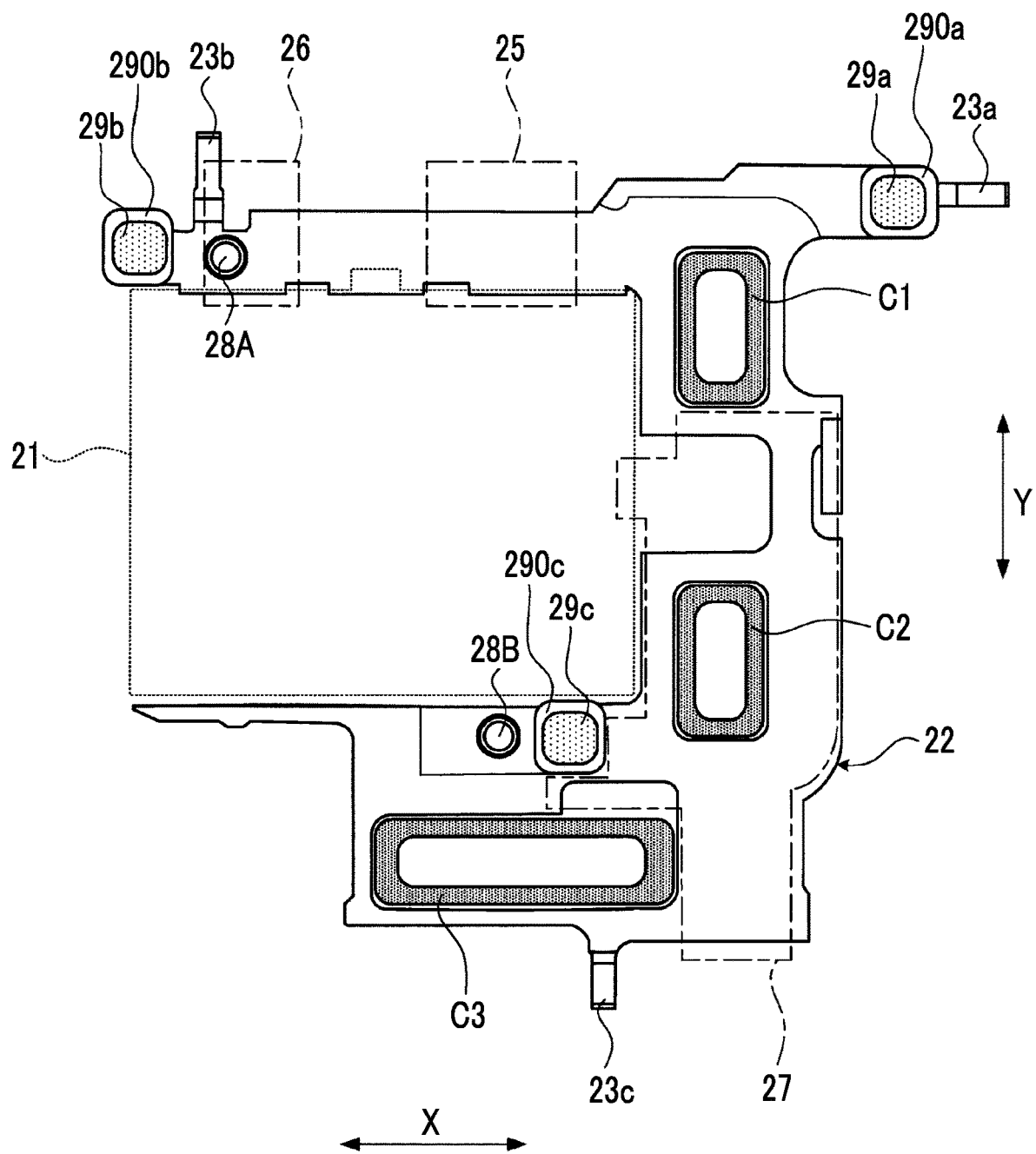
FIG. 8 is a plan view of the movable member 2 shown in FIG. 6 as viewed from the side opposite to the imaging optical system 101 side.

As shown in FIG. 5, the X-axis rotation drive magnet mv1 is fixed on a front surface of the yoke 18 of the pressing member 1B on the main body 1A side at a position facing the X-axis rotation drive magnet Mv1 of the main body 1A with the X-axis rotation drive coil C1 of the movable member 2 described in FIGS. 6 to 8 interposed therebetween.

An S-pole of the X-axis rotation drive magnet mv1 faces the N-pole of the X-axis rotation drive magnet Mv1 with the X-axis rotation drive coil C1 interposed therebetween. An N-pole of the X-axis rotation drive magnet mv1 faces the S-pole of the X-axis rotation drive magnet Mv1 with the X-axis rotation drive coil C1 interposed therebetween.

As shown in FIG. 5, the X-axis rotation drive magnet mv2 is fixed on a front surface of the yoke 18 of the pressing member 1B on the main body 1A side at a position facing the X-axis rotation drive magnet Mv2 of the main body 1A with the X-axis rotation drive coil C2 of the movable member 2 described in FIGS. 6 to 8 interposed therebetween.

An S-pole of the X-axis rotation drive magnet mv2 faces the N-pole of the X-axis rotation drive magnet Mv2 with the X-axis rotation drive coil C2 interposed therebetween. An N-pole of the X-axis rotation drive magnet mv2 faces the S-pole of the X-axis rotation drive magnet Mv2 with the X-axis rotation drive coil C2 interposed therebetween.

As shown in FIG. 5, the Y-axis drive magnet mv3 is fixed on a front surface of the yoke 18 of the pressing member 1B on the main body 1A side at a position facing the Y-axis drive magnet Mv3 with the Y-axis drive coil C3 of the movable member 2 described in FIGS. 6 to 8 interposed therebetween.

An S-pole of the Y-axis drive magnet mv3 faces the N-pole of the Y-axis drive magnet Mv3 with the Y-axis drive coil C3 interposed therebetween. An N-pole of the Y-axis drive magnet mv3 faces the S-pole of the Y-axis drive magnet Mv3 with the Y-axis drive coil C3 interposed therebetween.

As shown in FIG. 4, substantially plus-shaped yokes 12 as viewed in the direction Z are fixed to a portion facing the circuit board 21 fixed to the movable member 2 described in FIGS. 6 to 8 on a surface of the imaging optical system 101 side of the base 10 of the main body 1A.

The X-axis position detection magnet Mh1 constituting a first position detection magnet is fixed on a front surface of the yoke 12 at a position facing the X-axis position detection Hall element H1 (see FIG. 7 to be described below) fixed to the circuit board 21 fixed to the movable member 2.

The X-axis position detection magnet Mh1 has an S-pole $1s$ and an N-pole $1n$ which are arranged with a space in the direction X, and the X-axis position detection Hall element H1 is disposed to face an intermediate position between the S-pole $1s$ and the N-pole $1n$.

The N-pole $1n$ of the X-axis position detection magnet Mh1 is disposed on the left side in the direction X as viewed from the imaging optical system 101 side with respect to the S-pole $1s$ of the X-axis position detection magnet Mh1.

The Y-axis rotation position detection magnet Mh2 constituting a second position detection magnet is fixed on the front surface of the yoke 12 at a position facing the Y-axis rotation position detection Hall element H2 (see FIG. 7 to be described below) fixed to the circuit board 21 fixed to the movable member 2.

The Y-axis rotation position detection magnet Mh2 has an S-pole $2s$ and an N-pole $2n$ arranged with a space in the direction Y, and the Y-axis rotation position detection Hall element H2 is disposed to face an intermediate position between the S-pole $2s$ and the N-pole $2n$.

The N-pole $2n$ of the Y-axis rotation position detection magnet Mh2 is disposed on the upper side of the direction Y as viewed from the imaging optical system 101 side with respect to the S-pole $2s$ of the Y-axis rotation position detection magnet Mh2.

The Y-axis rotation position detection magnet Mh3 constituting a third position detection magnet is fixed on the front surface of the yoke 12 at a position facing the Y-axis rotation position detection Hall element H3 (see FIG. 7 to be described below) fixed to the circuit board 21 fixed to the movable member 2.

The Y-axis rotation position detection magnet Mh3 has an S-pole $3s$ and an N-pole $3n$ arranged with a space in the direction Y, and the Y-axis rotation position detection Hall element H3 is disposed to face an intermediate position between the S-pole $3s$ and the N-pole $3n$.

The N-pole $3n$ of the Y-axis rotation position detection magnet Mh3 is disposed on the lower side of the direction Y as viewed from the imaging optical system 101 side with respect to the S-pole $3s$ of the Y-axis rotation position detection magnet Mh3.

In the example shown in FIG. 4, the X-axis position detection magnet Mh1, the Y-axis rotation position detection magnet Mh2, and the Y-axis rotation position detection magnet Mh3 are coupled and integrated by a coupling member 13. Since the coupling member 13 is fixed to the yoke 12, the X-axis position detection magnet Mh1, the Y-axis rotation position detection magnet Mh2, and the Y-axis rotation position detection magnet Mh3 are fixed to the main body 1A.

The yoke 12 is fixed to the base 10 by screws inserted from screw holes formed on a surface opposite to the imaging optical system 101 side of the base 10 of the main body 1A.

As shown in FIG. 4, three flat surfaces 15a, 15b, and 15c perpendicular to the direction Z are formed on the surface of the imaging optical system 101 side of the base 10. The positions of the flat surfaces 15a, 15b, and 15c in the direction Z are all the same, and these flat surfaces are all formed on the same flat surface.

On the surface on the imaging optical system 101 side of the base 10, a hole portion 11a for restricting the movement of the movable member 2 is formed on an upper side in the direction Y from the Y-axis rotation position detection magnet Mh3, and a hole portion 11b for restricting the movement of the movable member 2 is formed on a lower side in the direction Y from the Y-axis rotation position detection magnet Mh2, as viewed from the imaging optical system 101 side.

As shown in FIG. 5, a frame-shaped standing portion 110a which extends in a direction perpendicular to the rear surface 10a and surrounds the hole portion 11a, and a frame-shaped standing portion 110b which extends in the direction perpendicular to the rear surface 10a and surrounds the hole portion 11b are formed on a rear surface 10a of the base 10 on a side opposite to the imaging optical system 101 side.

As shown in FIG. 5, a hook 16a extending in the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

FIG. 6 is a perspective view of the movable member 2 in the image shake correction device 3 shown in FIG. 3 as viewed from the imaging optical system 101 side.

FIG. 7 is a perspective view of the movable member 2 shown in FIG. 6 as viewed from the side opposite to the imaging optical system 101 side.

FIG. 8 is a plan view of the movable member 2 shown in FIG. 6 as viewed from the side opposite to the imaging optical system 101 side. In FIG. 8, in order to facilitate understanding of the configuration of the movable member 2, the circuit board 21 fixed to the movable member 2 is indicated by a broken line, and flexible print substrates 25, 26, and 27 connected to the circuit board 21 are indicated by imaginary lines.

As shown in FIG. 8, the movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging optical system 101 side.

As shown in FIGS. 6 and 7, the circuit board 21 on which the imaging element 20 is mounted is fixed to the base 22 with an adhesive at a portion facing a region surrounded by the three portions.

As shown in FIGS. 6 to 8, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 6 to 8 and the X-axis rotation drive magnets Mv1 and mv1 shown in FIG. 4 constitute an X-axis drive voice coil motor (VCM).

The X-axis drive VCM moves the movable member 2 in the direction X by an electromagnetic induction action between the X-axis rotation drive coil C1 and the X-axis rotation drive magnets Mv1 and mv1 by causing a control current to flow through the X-axis rotation drive coil C1.

The X-axis rotation drive coil C2 shown in FIGS. 6 to 8 and the X-axis rotation drive magnets Mv2 and mv2 shown in FIG. 4 constitute a VCM. This VCM and the X-axis drive VCM constitute a rotation drive VCM.

The rotation drive VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction action between the X-axis rotation drive coil C2 and the X-axis rotation drive magnets Mv2 and mv2 by reversing the directions of the control currents flowing through the X-axis rotation drive coil C1 and the X-axis rotation drive coil C2 shown in FIGS. 6 to 8.

The Y-axis drive coil C3 shown in FIGS. 6 to 8 and the Y-axis drive magnets Mv3 and mv3 shown in FIG. 4 constitute a Y-axis drive VCM.

The Y-axis drive VCM moves the movable member 2 in the direction Y by an electromagnetic induction action between the Y-axis drive coil C3 and the Y-axis drive magnets Mv3 and mv3 by causing the control current to flow through the Y-axis drive coil C3.

As shown in FIG. 7, the X-axis position detection Hall element H1 is fixed at a position facing the intermediate position between the S-pole 1s and the N-pole 1n of the X-axis position detection magnet Mh1 on a surface of the main body 1A side of the circuit board 21 fixed to the base 22 (hereinafter, referred to as a rear surface of the circuit board 21).

The Y-axis rotation position detection Hall element H2 is fixed at a position facing the intermediate position between the S-pole 2s and the N-pole 2n of the Y-axis rotation position detection magnet Mh2 on the rear surface of the circuit board 21.

The Y-axis rotation position detection Hall element H3 is fixed at a position facing the intermediate position between the S-pole 3s and the N-pole 3n of the Y-axis rotation position detection magnet Mh3 on the rear surface of the circuit board 21.

The X-axis position detection Hall element H1 outputs a signal corresponding to a magnetic field supplied from the X-axis position detection magnet Mh1, and the system controller 108 detects a position of the movable member 2 in the direction X by an output change of this signal.

The Y-axis rotation position detection Hall element H2 outputs a signal corresponding to a magnetic field supplied from the Y-axis rotation position detection magnet Mh2, and the system controller 108 detects a position of the movable member 2 in the direction Y by an output change of this signal.

The Y-axis rotation position detection Hall element H3 outputs a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

Figure 9:
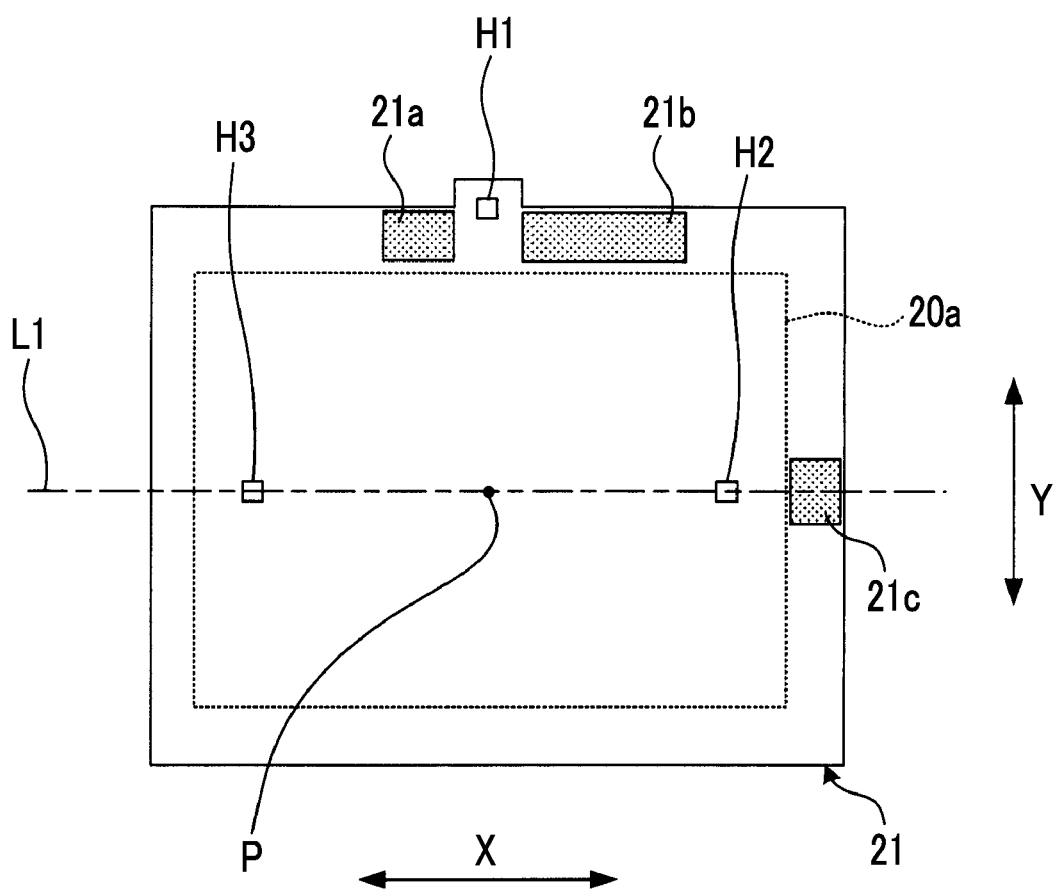
FIG. 9 is a diagram showing a state in which a rear surface of a circuit board 21 fixed to a base 22 of the movable member 2 shown in FIG. 7 is viewed in a direction Z.

FIG. 9 is a diagram showing a state in which the rear surface of the circuit board 21 fixed to the base 22 of the movable member 2 shown in FIG. 7 is viewed in the direction Z.

In FIG. 9, the center P of the light receiving surface 20a of the imaging element 20 that overlaps the rear surface of the circuit board 21 is shown. In FIG. 9, a straight line L1 which passes through the center P and is parallel to the direction X is illustrated, and the Y-axis rotation position detection Hall element H2 and the Y-axis rotation position detection Hall element H3 are arranged on the straight line L1. A distance from the Y-axis rotation position detection Hall element H2 to the center P and a distance from the Y-axis rotation position detection Hall element H3 to the center P are the same.

As shown in FIG. 4, the Y-axis rotation position detection magnet Mh2 facing the Y-axis rotation position detection Hall element H2 and the Y-axis rotation position detection magnet Mh3 facing the Y-axis rotation position detection Hall element H3 are arranged such that magnetic poles are opposite to each other in the direction Y.

In a case where the movable member 2 rotates in the right direction of the direction θ as viewed from the imaging optical system 101 side, the Y-axis rotation position detection Hall element H2 and the Y-axis rotation position detection Hall element H3 move in opposite directions to each other in the direction Y by the same distance. Thus, the outputs of the Y-axis rotation position detection Hall element H2 and the Y-axis rotation position detection Hall element H3 are changed in the same manner.

The output signal of the Y-axis rotation position detection Hall element H2 output signal, the movement direction and the movement distance of the Y-axis rotation position detection Hall element H2, the output signal of the Y-axis rotation position detection Hall element H3, the movement direction and the movement distance of the Y-axis rotation position detection Hall element H3, and the rotation angle of the movable member 2 in the direction θ are associated with each other in advance, and thus, it is possible to detect the rotation position of the movable member 2 in the direction θ by the output signals of the Y-axis rotation position detection Hall element H2 and the Y-axis rotation position detection Hall element H3.

Meanwhile, in a case where the movable member 2 moves only in the direction Y, the Y-axis rotation position detection Hall element H2 and the Y-axis rotation position detection Hall element H3 move in the same direction in the direction Y by the same distance.

Thus, the output signals of the Y-axis rotation position detection Hall element H2 and the Y-axis rotation position detection Hall element H3 are changed in opposite directions.

Therefore, in a case where the outputs of the Y-axis rotation position detection Hall element H2 and the Y-axis rotation position detection Hall element H3 are changed in opposite directions, it is possible to detect the position of the movable member 2 in the direction Y by viewing the output of the Y-axis rotation position detection Hall element H2 or the Y-axis rotation position detection Hall element H3.

As shown in FIGS. 6 to 8, a hook 23a extending in the same direction (direction X) as the hook 16a is formed at the base 22 at a position facing the hook 16a (see FIG. 4) of the support member 1. The other end of the spring 24a shown in FIG. 3 is locked to the hook 23a.

The movable member 2 is biased toward the main body 1A by the spring 24a locked to the hooks 16a and 23a.

As shown in FIGS. 6 and 8, a hook 23b extending in the same direction (up direction of the direction Y) as the hook 16b is formed at the base 22 at a position facing the hook 16b (see FIG. 4) of the support member 1. The other end of the spring 24b shown in FIG. 3 is locked to the hook 23b.

The movable member 2 is biased toward the main body 1A by the spring 24b locked to the hooks 16b and 23b.

As shown in FIGS. 6 to 8, a hook 23c extending in the same direction (down direction of the direction Y) as the hook 16c is formed at the base 22 at a position facing the hook 16c (see FIG. 4) of the support member 1. The other end of the spring 24c shown in FIG. 3 is locked to the hook 23c.

The movable member 2 is biased toward the main body 1A by the spring 24c locked to the hooks 16c and 23c.

The pair of the hook 16a and the hook 23a, the pair of the hook 16b and the hook 23b, and the pair of the hook 16c and the hook 23c are formed such that a center of gravity of the movable member 2 is disposed inside a triangle formed by connecting these three pairs in plan view viewed in the direction Z.

As shown in FIGS. 7 and 8, a recess portion 290a that accommodates a rolling element (spherical ball) for causing the movable member 2 to be movable on a surface perpendicular to the direction Z at a position facing the flat surface 15a of the main body 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the main body 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the main body 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface.

The movable member 2 moves on the flat surface perpendicular to the direction Z by rolling the rolling elements disposed between the bottom surface 29a of the movable member 2 and the flat surface 15a of the main body 1A, between the bottom surface 29b of the movable member 2 and the flat surface 15b of the main body 1A, and between the bottom surface 29c of the movable member 2 and the flat surface 15c of the main body 1A.

As shown in FIG. 7, a connector 21a and a connector 21b are formed at an upper end portion of the rear surface of the circuit board 21 fixed to the movable member 2 in the direction Y. A connector 21c is formed at an end portion on a side close to the base 22 among the end portions on the rear surface of the circuit board 21 in the direction X.

The connector 21a and the connector 21b include terminals connected to various terminals (a power supply terminal which is a terminal for supplying a power, a ground terminal which is a terminal for grounding, a terminal for outputting a signal, and a drive terminal) of the imaging element 20 mounted on the circuit board 21.

The flexible print substrate 26 which is a first flexible substrate including wirings connected to the terminals included in the connectors is connected to the connector 21a.

The flexible print substrate 25 which is a first flexible substrate including wirings connected to the terminals included in the connectors is connected to the connector 21b.

The connector 21c includes a terminal connected to an output terminal of each of the X-axis position detection Hall element H1, the Y-axis rotation position detection Hall element H2, and the Y-axis rotation position detection Hall element H3 mounted on the rear surface of the circuit board 21.

The flexible print substrate 27 which is a second flexible substrate including wirings connected to the terminals included in the connector is connected to the connector 21c.

The flexible print substrate 27 includes a fixed portion 27a that extends along the direction Y and is fixed to the base 22, and a non-fixed portion 27b that is free with respect to the base 22.

As shown in FIG. 8, an attachment portion 28A is formed on the surface of the main body 1A side of the base 22. As shown in FIG. 7, a flat plate portion 280a extending in the down direction of the direction Y at a position overlapping the circuit board 21 is fixed to the attachment portion 28A with screws. An insertion member 28a protruding in the direction Z toward the main body 1A side is formed at the flat plate portion 280a.

As shown in FIG. 8, an attachment portion 28B is formed on the surface of the main body 1A side of the base 22. As shown in FIG. 7, a flat plate portion 280b extending in the up direction of the direction Y at a position overlapping the circuit board 21 is fixed to the attachment portion 28B with screws. An insertion member 28b protruding in the direction Z toward the main body 1A side is formed at the flat plate portion 280b.

The insertion member 28a is inserted into the hole portion 11a of the main body 1A shown in FIG. 4. The insertion member 28b is inserted into the hole portion 11b of the main body 1A shown in FIG. 4.

In a case where the movable member 2 moves on the surface perpendicular to the direction Z, the movement range of the insertion member 28a is limited to the inside of the hole portion 11a, and the movement range of the insertion member 28b is limited to the inside of the hole portion 11b. Thus, the movement range of the movable member 2 (the movement range in the direction X, the movement range in the direction Y, and the movement range in the direction θ) is restricted to a predetermined range by the pair of the insertion member 28a and the hole portion 11 and the pair of the insertion member 28b and the hole portion 11b.

The pair of the insertion member 28a and the hole portion 11a and the pair of the insertion member 28b and the hole portion 11b constitute movement restriction units that restrict the movement range of the movable member 2, respectively.

Next, a configuration of the movement restriction unit will be described in detail.

Figure 10:
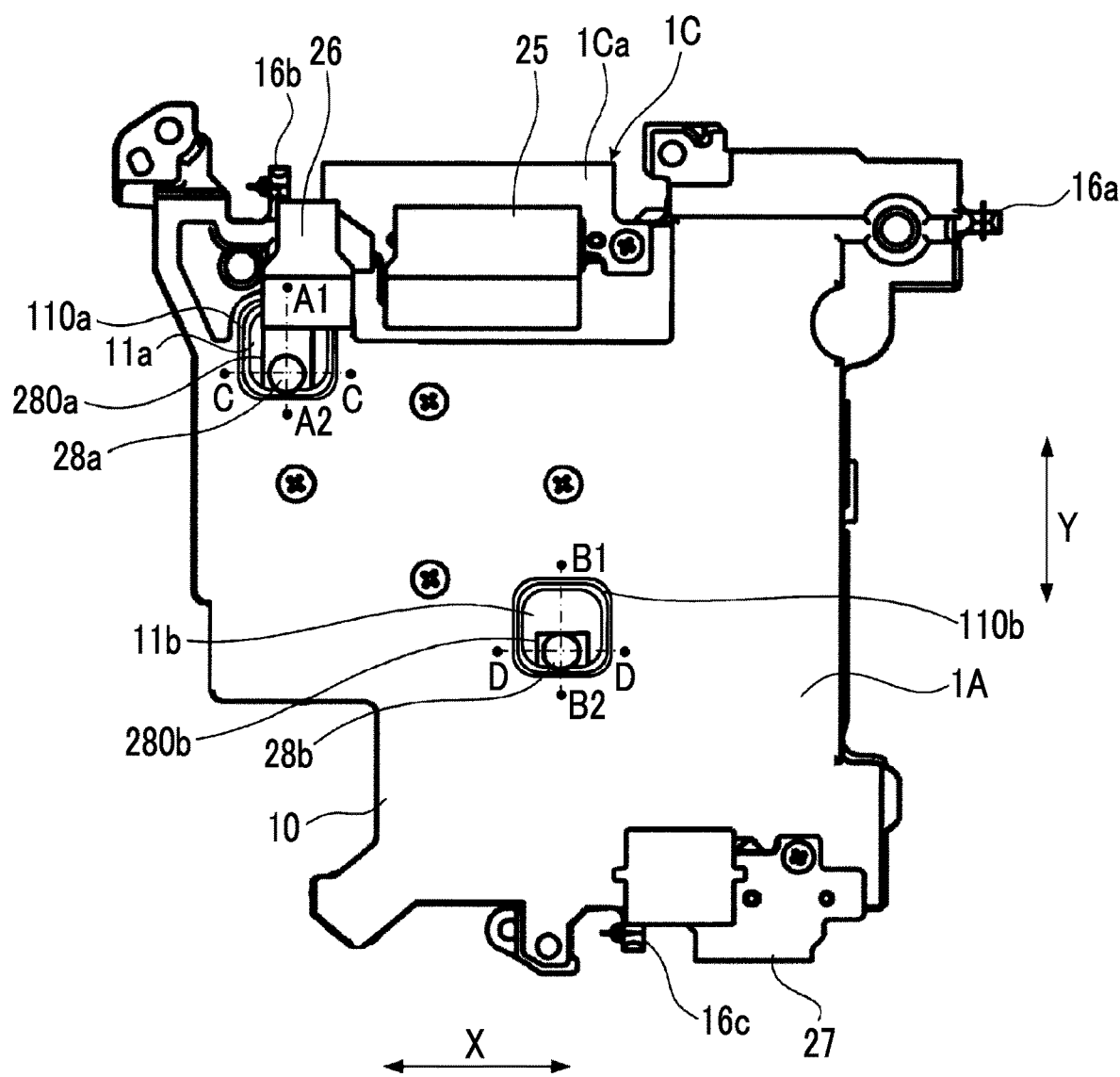
FIG. 10 is a rear view of the image shake correction device 3 shown in FIG. 3 as viewed in the direction Z from the side opposite to the imaging optical system 101 side.

FIG. 10 is a rear view of the image shake correction device 3 shown in FIG. 3 as viewed in the direction X from the side opposite to the imaging optical system 101 side. FIG. 10 shows a state in which the movable member 2 is moved to the maximum in the down direction in this diagram of the direction Y (in a direction away from the pressing member 1C).

Figure 11:
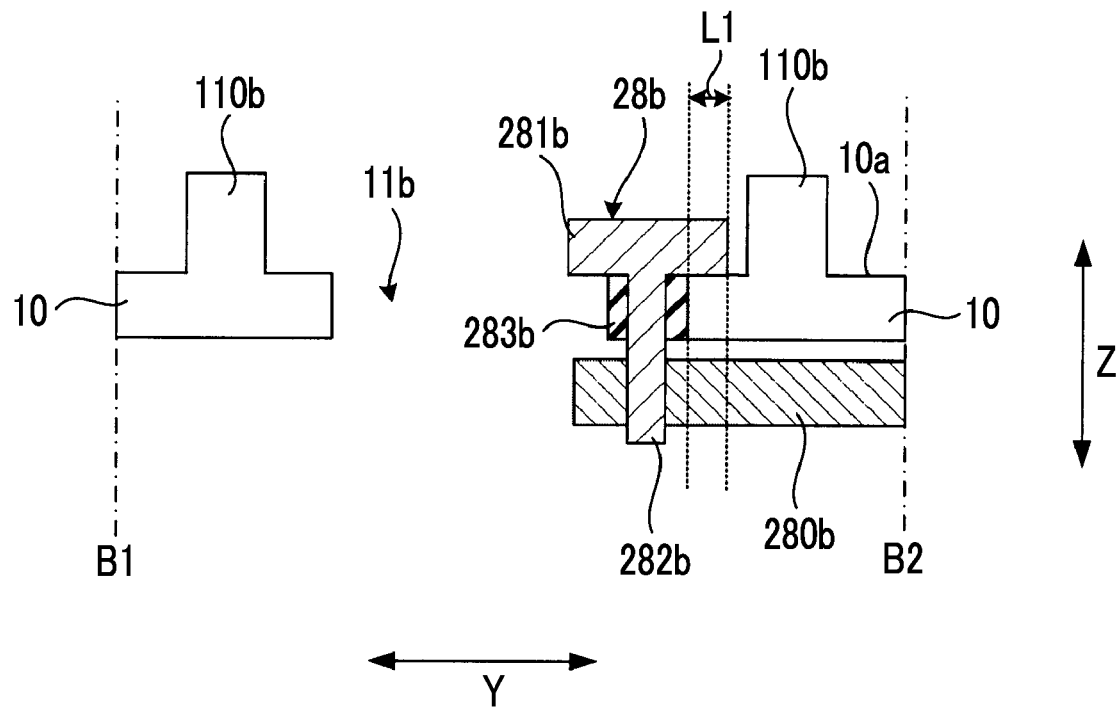
FIG. 11 is a schematic cross-sectional view of the image shake correction device 3 shown in FIG. 10 taken along a line B1-B2.
Figure 12:
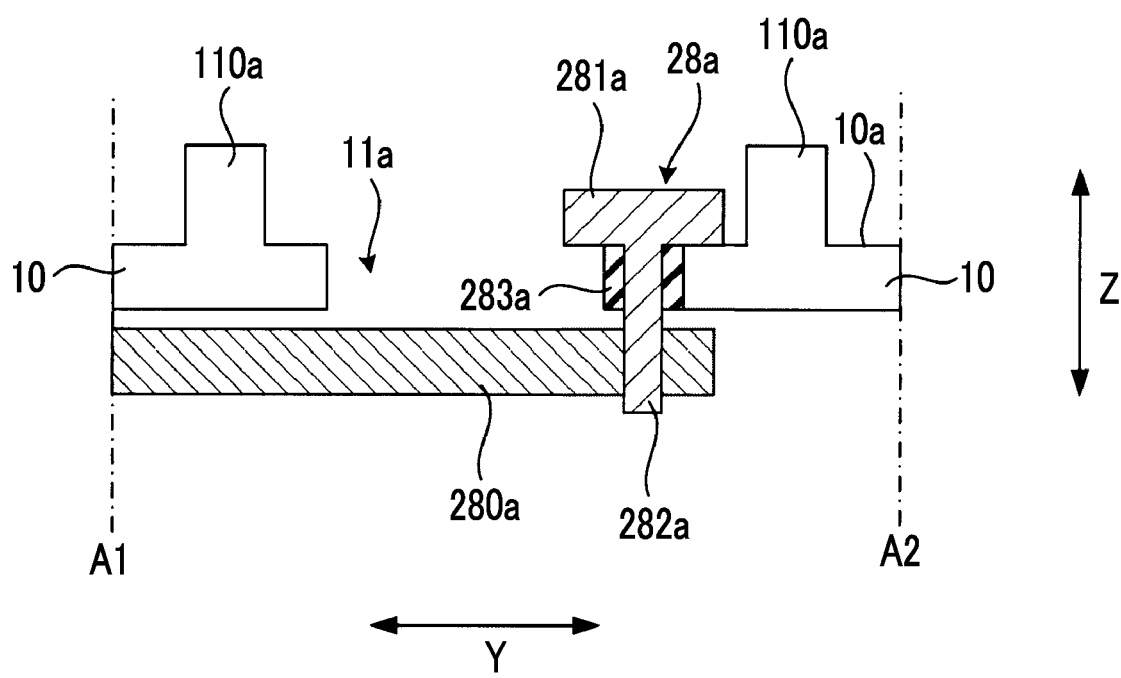
FIG. 12 is a schematic cross-sectional view of the image shake correction device 3 shown in FIG. 10 taken along a line A1-A2.
Figure 13:
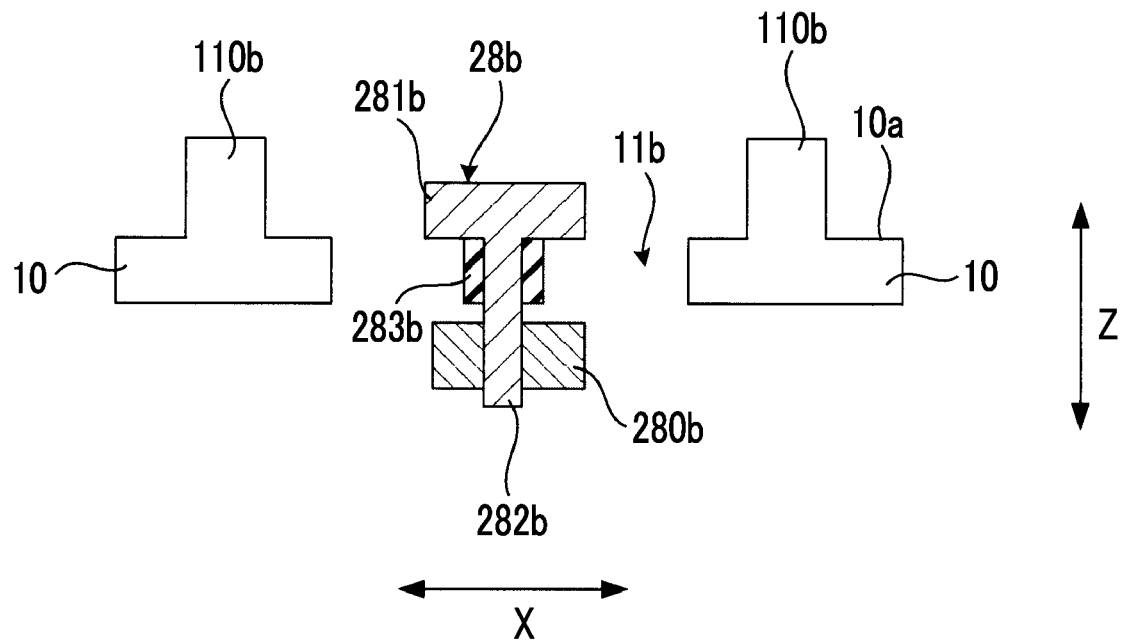
FIG. 13 is a schematic cross-sectional view of the image shake correction device 3 shown in FIG. 10 taken along a line D-D.
Figure 14:
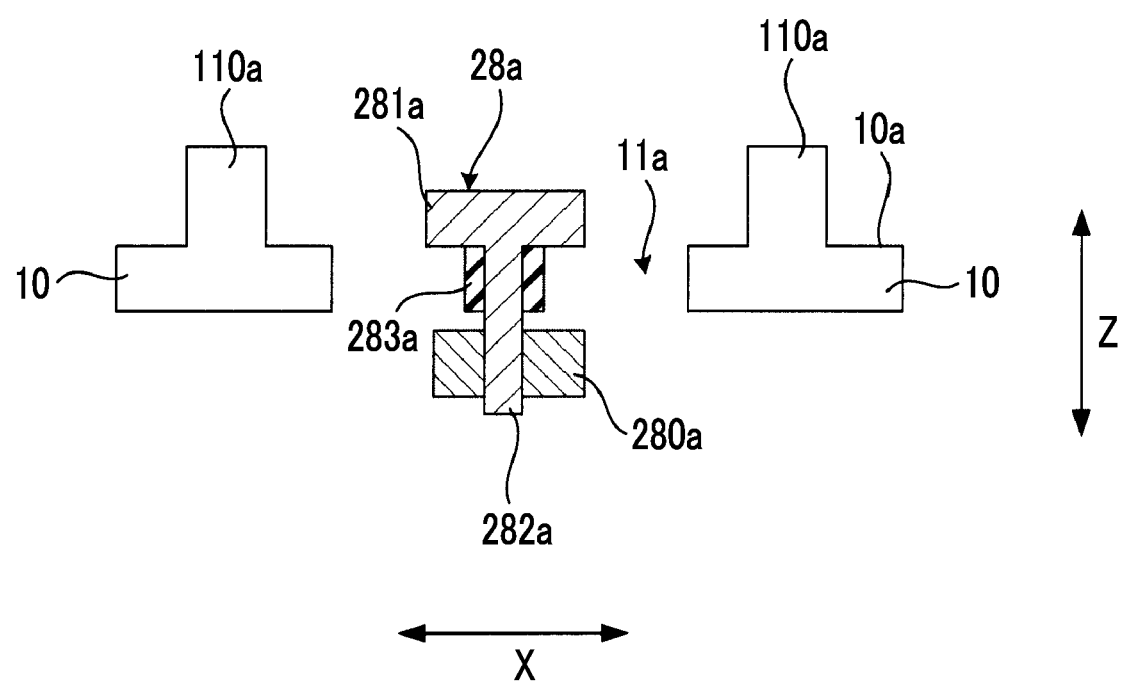
FIG. 14 is a schematic cross-sectional view of the image shake correction device 3 shown in FIG. 10 taken along a line C-C.

FIG. 11 is a schematic cross-sectional view of the image shake correction device 3 shown in FIG. 10 taken along a line B1-B2. FIG. 12 is a schematic cross-sectional view of the image shake correction device 3 shown in FIG. 10 taken along a line A1-A2. FIG. 13 is a schematic cross-sectional view of the image shake correction device 3 shown in FIG. 10 taken along a line D-D. FIG. 14 is a schematic cross-sectional view of the image shake correction device 3 shown in FIG. 10 taken along a line C-C. FIGS. 11 to 14 show only components related to the movement restriction unit.

As shown in FIG. 11, the insertion member 28b comprises a columnar shaft portion 282b which is fixed to the flat plate portion 280b and extends in the direction Z, a wide width portion 281b formed at a front end of the shaft portion 282b, and an abutting portion 283b of which an outer shape in which the shaft portion 282b is fitted into a hollow portion is a cylindrical shape.

The abutting portion 283b is made of, for example, an elastic body such as rubber, and may be located in the hole portion 11b and may enter a state in which the abutting portion abuts on an inner surface of the hole portion 11b and a state in which the abutting portion does not abut on this inner surface by moving in each of the direction X, the direction Y, and the direction θ in the hole portion 11b with the movement of the movable member 2 even in a state in which the movable member 2 is located at any position of the movable range.

The wide width portion 281b is disposed outside the hole portion 11b (outside opposite to the movable member 2 side on which the insertion member 28b is formed). As shown in FIGS. 11 and 13, widths of the wide width portion 281b in the direction X and the direction Y are wider than those of the abutting portion 283b.

Specifically, a right end portion of the wide width portion 281b in the direction Y in FIG. 11 is located so as to be closer to the right side than a right end portion of the abutting portion 283b in the direction Y in FIG. 11. A left end portion of the wide width portion 281b in the direction Y in FIG. 11 is located so as to be closer to the left side than a left end portion of the abutting portion 283b in the direction Y of FIG. 11.

As shown in FIG. 13, both end portions of the wide width portion 281b in the direction X are located so as to be closer to the outside than both end portions of the abutting portion 283b in the direction X.

A width of the wide width portion 281b in the direction X is smaller than a width of the hole portion 11b in the direction X, and a width of the wide width portion 281b in the direction Y is smaller than a width of the hole portion 11b in the direction Y. That is, a plane area of the wide width portion 281b as viewed from the direction Z is smaller than a plane area of the hole portion 11b as viewed from the direction Z.

As shown in FIG. 12, the insertion member 28a comprises a columnar shaft portion 282a which is fixed to the flat plate portion 280a and extends in the direction Z, a wide width portion 281a formed at a front end of the shaft portion 282a, and an abutting portion 283a of which an outer shape in which the shaft portion 282a is fitted into a hollow portion is a cylindrical shape.

The abutting portion 283a is made of, for example, an elastic body such as rubber, and may be located in the hole portion 11a and may enter a state in which the abutting portion abuts on an inner surface of the hole portion 11a and a state in which the abutting portion does not abut on this inner surface by moving in each of the direction X, the direction Y, and the direction θ in the hole portion 11a with the movement of the movable member 2 even in a state in which the movable member 2 is located at any position of the movable range.

The wide width portion 281a is disposed outside the hole portion 11a (outside opposite to the movable member 2 side on which the insertion member 28a is formed). As shown in FIGS. 12 and 14, widths of the wide width portion 281a in the direction X and the direction Y are wider than those of the abutting portion 283a.

Specifically, a right end portion of the wide width portion 281a in the direction Y in FIG. 12 is located so as to be closer to the right side than a right end portion of the abutting portion 283a in the direction Y in FIG. 12. A left end portion of the wide width portion 281a in the direction Y in FIG. 12 is located so as to be closer to the left side than a left end portion of the abutting portion 283a in the direction Y in FIG. 12.

As shown in FIG. 14, both end portions of the wide width portion 281a in the direction X are located so as to be closer to the outside than both end portions of the abutting portion 283a in the direction X.

A width of the wide width portion 281a in the direction X is smaller than a width of the hole portion 11a in the direction X, and a width of the wide width portion 281a in the direction Y is smaller than a width of the hole portion 11a in the direction Y. That is, a plane area of the wide width portion 281a as viewed from the direction Z is smaller than a plane area of the hole portion 11a as viewed from the direction Z.

As shown in FIG. 10, in a state in which the movable member 2 is moved to the maximum in the down direction of the direction Y, the function of preventing the movable member 2 from moving in the direction Z by the flat plate portion 1Cc of the pressing member 1C is not effective.

However, in this state, as shown in FIGS. 11 and 12, the wide width portion 281a of the insertion member 28a and the wide width portion 281b of the insertion member 28b overlap the rear surface 10a of the base 10 as viewed in the direction Z.

Therefore, in FIGS. 11 and 12, even though gravity is applied to the movable member 2 in the down direction of the direction Z, the wide width portion 281a and the wide width portion 281b are hooked on the base 10, and thus, the movable member 2 is prevented from moving in the down direction in FIGS. 11 and 12.

The action of preventing the movement by the wide width portions 281a and 281b is similarly obtained even in a state in which the movable member 2 moves to the vicinity of both end portions in the direction X and the vicinity of the upper end portion in the direction Y in the movable range thereof in FIG. 10.

As shown in FIG. 11, in a state in which the movable member 2 is located at a position at which a distance L2 between the right end portion of the abutting portion 283b in the direction Y and the inner surface of the hole portion 11b is less than a distance L1 between the right end portion of the wide width portion 281b in the direction Y and the right end portion of the abutting portion 283b in the direction Y, the flat plate portion 1Cc of the pressing member 1C does not overlap with the movable member 2 in the direction Z, and the movement prevention function is not effective.

Meanwhile, in a state in which the movable member 2 is located at a position at which the distance L2 is equal to or longer than the distance L1, the flat plate portion 1Cc of the pressing member 1C overlaps the movable member 2 in the direction Z, and the movement prevention function is effective.

As described above, according to the image shake correction device 3, the amount of the flat plate portion 1Cc projecting in the direction Y and the width thereof in the direction X can be reduced by increasing the distance L1 at each of the insertion members 28a and 28b, and the size reduction and weight reduction of the image shake correction device 3 can be realized.

In the image shake correction device 3, since the movable member 2 also moves in the direction θ, the size of the flat plate portion 1Cc is restricted. Therefore, it is very effective to combine the function of preventing movement in the direction Z by the movement restriction unit.

According to the image shake correction device 3, the movement prevention member constituted by the pressing member 1B and the pressing member 1C is formed along two long sides and one short side of the light receiving surface 20a of the imaging element 20. Thus, for example, a sufficient movement prevention effect can be obtained as compared with a configuration in which the pressing member 1C is omitted. The width of the light receiving surface 20a in the longitudinal direction can be reduced, and the size thereof can be reduced as compared with the configuration in which the pressing members are arranged along the two short sides of the light receiving surface 20a.

According to the image shake correction device 3, the wide width portions 281a and 281b come into contact with the rear surface 10a of the base 10 only in a state in which the movable member 2 is located at an edge part of the movable range. Thus, the friction between the wide width portions 281a and 281b and the rear surface 10a of the base 10 can be reduced as much as possible, and the responsiveness of driving the movable member 2 can be improved. A power for driving can be reduced.

According to the image shake correction device 3, the wide width portions 281 a and 281 b contact the rear surface 10 a of the base 10 in a state where the movable member 2 is located in the peripheral portion of the movable range. Thus, even though an installation area of the pressing member 1B is reduced, a sufficient movement prevention effect can be obtained. Therefore, the size reduction and weight reduction can be achieved.

According to the image shake correction device 3, the abutting portions 283a and 283b come in contact with the inner surfaces of the hole portions 11a and 11b only in a state in which the movable member 2 is located at the end portion of the movable range. Thus, the friction between the abutting portions 283a and 283b and the base 10 can be reduced as much as possible, and the responsiveness of driving the movable member 2 can be improved. A power for driving can be reduced.

According to the image shake correction device 3, the standing portions 110a and 110b are formed on the rear surface 10a of the base 10 with which the wide width portions 281a and 281b can come into contact so as to surround the hole portions 11a and 11b. Thus, even though the base 10 is thinned, the base 10 can be given sufficient strength to receive a load of the movable member 2. As a result, it is possible to achieve the size reduction and weight reduction of the image shake correction device 3.

Next, a modification example of the insertion members 28a and 28b will be described.

Figure 15:
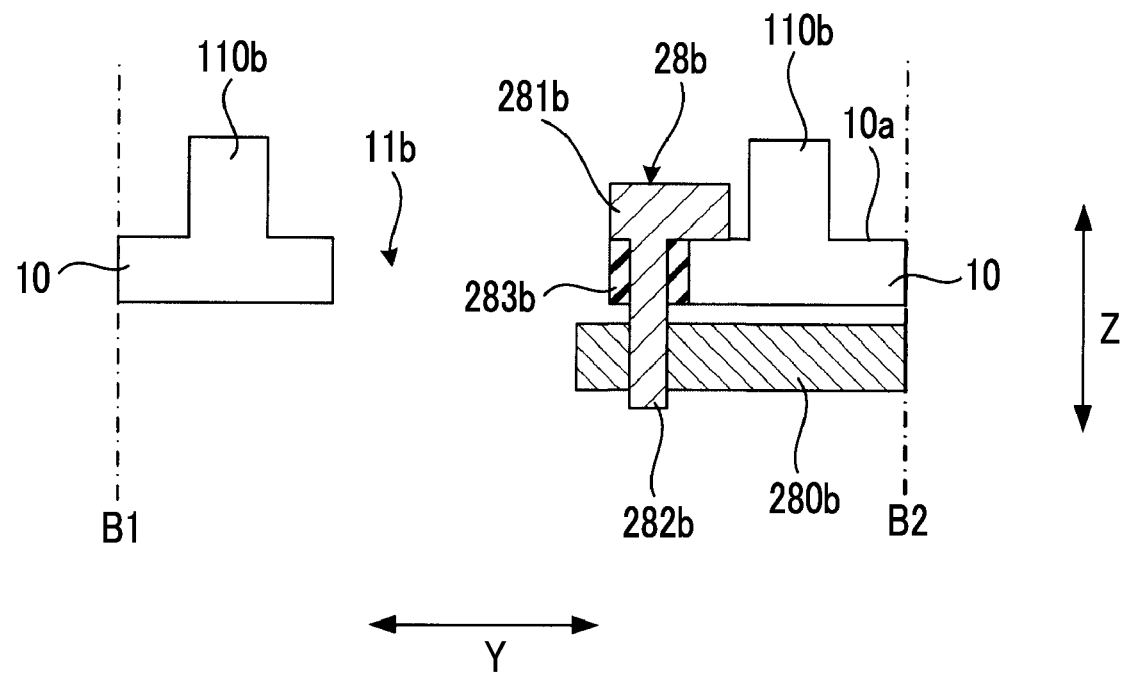
FIG. 15 is a diagram showing a modification example of an insertion member 28b, and is a schematic cross-sectional view corresponding to FIG. 11.
Figure 16:
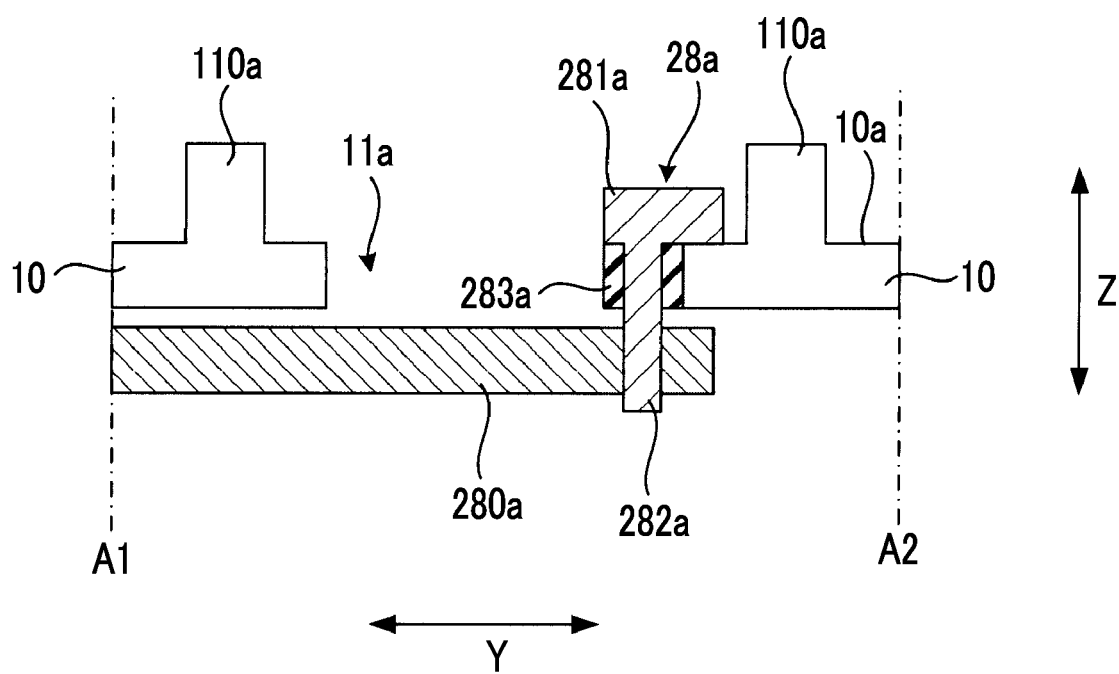
FIG. 16 is a diagram showing a modification example of the insertion member 28a, and is a schematic cross-sectional view corresponding to FIG. 12.
Figure 17:
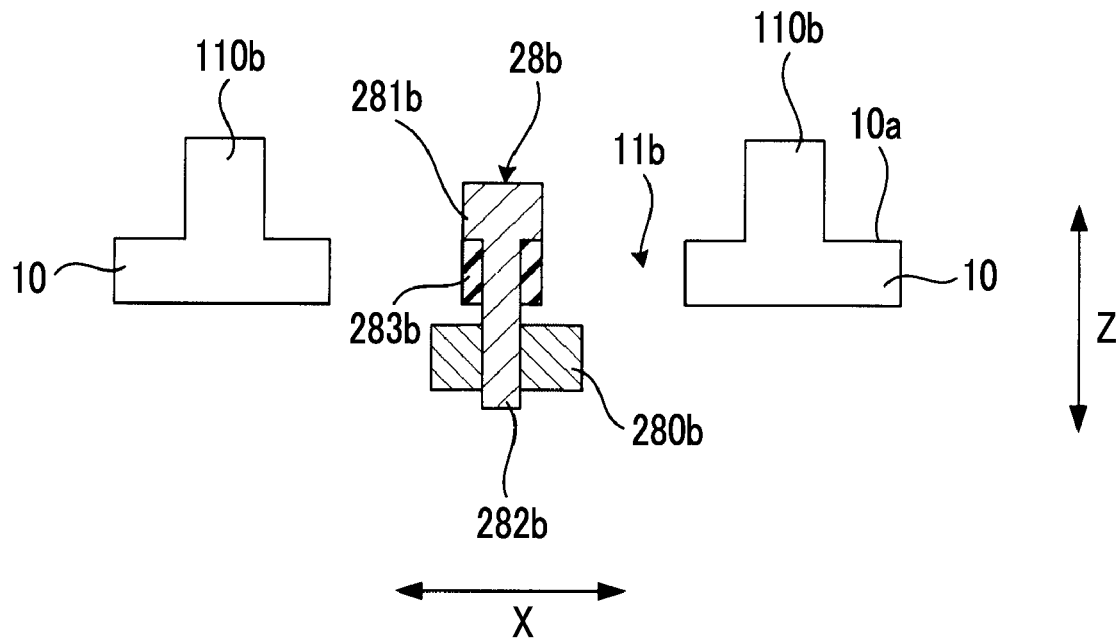
FIG. 17 is a diagram showing a modification example of the insertion member 28b, and is a schematic cross-sectional view corresponding to FIG. 13.
Figure 18:
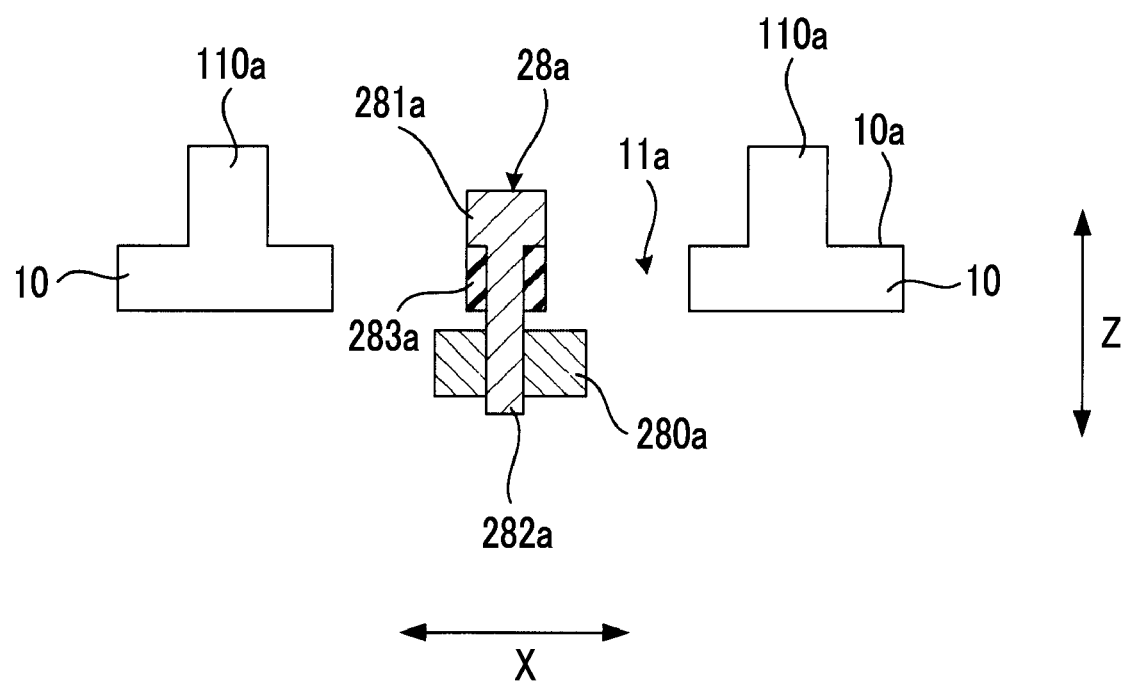
FIG. 18 is a diagram showing a modification example of the insertion member 28a, and is a schematic cross-sectional view corresponding to FIG. 14.

FIG. 15 is a diagram showing the modification example of the insertion member 28b, and is a schematic cross-sectional view corresponding to FIG. 11. FIG. 16 is a diagram showing the modification example of the insertion member 28a, and is a schematic cross-sectional view corresponding to FIG. 12. FIG. 17 is a diagram showing the modification example of the insertion member 28b, and is a schematic cross-sectional view corresponding to FIG. 13. FIG. 18 is a diagram showing the modification example of the insertion member 28a, and is a schematic cross-sectional view corresponding to FIG. 14.

As shown in FIG. 15, the insertion member 28b of this modification example is configured such that a left end portion of the wide width portion 281b in the direction Yin FIG. 15 (an end portion on a side on which the pressing member 1C is disposed) is located at the same position as a left end portion of the abutting portion 283b in the direction Y in FIG. 15 and a right end portion of the wide width portion 281b in the direction Yin FIG. 15 is located so as to be closer to the right side than a right end portion of the abutting portion 283b in the direction Yin FIG. 15.

As shown in FIG. 17, in the insertion member 28b of this modification example, both end portions of the wide width portion 281b in the direction X are located at the same positions as both end portions of the abutting portion 283b in the direction X.

As shown in FIG. 16, the insertion member 28a of this modification example is such that a left end portion of the wide width portion 281a in the direction Y in FIG. 16 (an end portion on a side on which the pressing member 1C is disposed) is located at the same position as a left end portion of the abutting portion 283a in the direction Yin FIG. 16 and a right end portion of the wide width portion 281a in the direction Yin FIG. 16 is located so as to be closer to the right side than a right end portion of the abutting portion 283a in the direction Yin FIG. 16.

As shown in FIG. 18, in the insertion member 28a of this modification example, both end portions of the wide width portion 281a in the direction X are located at the same positions as both end portions of the abutting portion 283a in the direction X.

According to the configuration of the insertion members 28a and 28b shown in FIGS. 15 to 18, the wide width portions 281a and 281b come in contact with the rear surface 10a of the base 10 only in a state in which the movable member 2 is located at an end portion of the movable range on one side in the direction Y. Thus, the friction between the wide width portions 281a and 281b and the rear surface 10a of the base 10 can be reduced as much as possible, and the responsiveness of driving the movable member 2 can be improved. A power for driving can be reduced.

Although it has been described that the image shake correction device 3 moves the movable member 2 in three directions, it is possible to achieve the size reduction and weight reduction while preventing the movable member 2 from being lifted by the configuration of the aforementioned movement restriction unit even in the image shake correction device that moves the movable member 2 only in two directions of the direction X and the direction Y.

In the case of the image shake correction device that moves the movable member 2 only in the two directions of the direction X and the direction Y, the hole portion 11b, the standing portion 110b, and the insertion member 28b may be omitted. The lifting of the movable member 2 in a case where the movement prevention function by the pressing member 1C is not effective can be effectively prevented by disposing at least the movement restriction unit at a position close to the pressing member 1C which less overlaps with the movable member 2. For the same reason, in the image shake correction device 3, the insertion member 28b may not have the wide width portion 281b.

Although it has been described that the hole portions 11a and 11b are formed in the main body 1A of the support member 1 and the insertion members 28a and 28b are fixed to the movable member 2, even though the insertion members 28a and 28b are fixed to the main body 1A and the hole portions 11a and 11b are formed in the movable member 2, the aforementioned effects can be obtained.

Next, a configuration of a smartphone will be described as another embodiment of the imaging device of the present invention.

Figure 19:
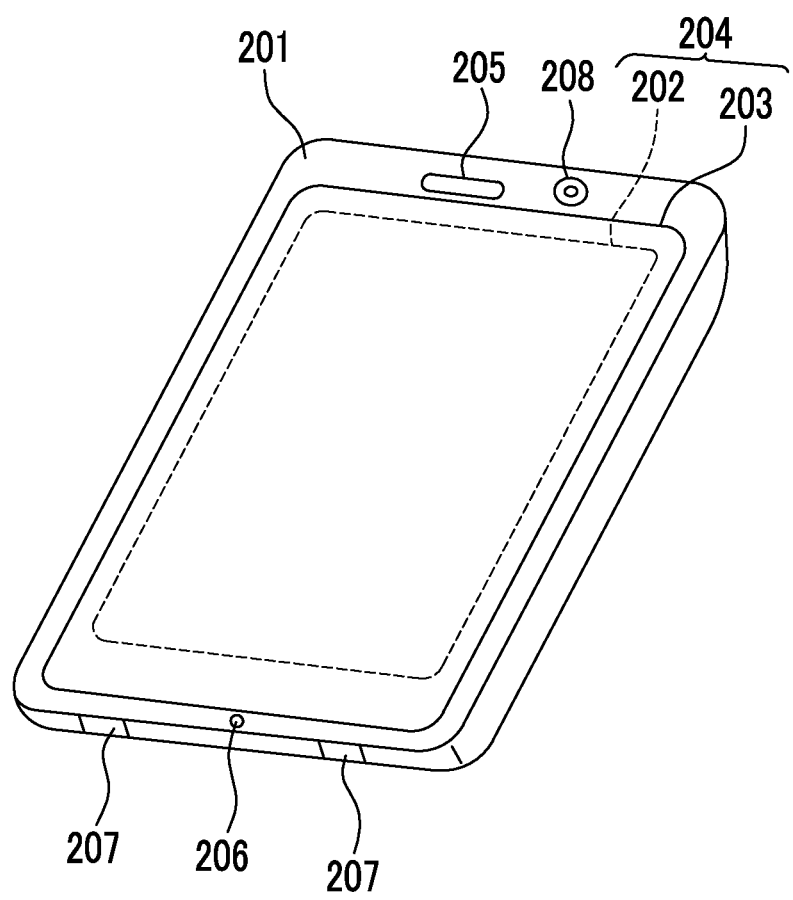
FIG. 19 shows an appearance of a smartphone 200 that is an embodiment of the imaging device of the present invention.

FIG. 19 shows an appearance of a smartphone 200 that is an embodiment of the imaging device of the present invention.

A smartphone 200 shown in FIG. 19 includes a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208.

The configuration of the casing 201 is not limited thereto, and for example, a configuration in which the display surface and the input unit are independent can be employed, or a configuration having a folding structure or a slide mechanism can be employed.

Figure 20:
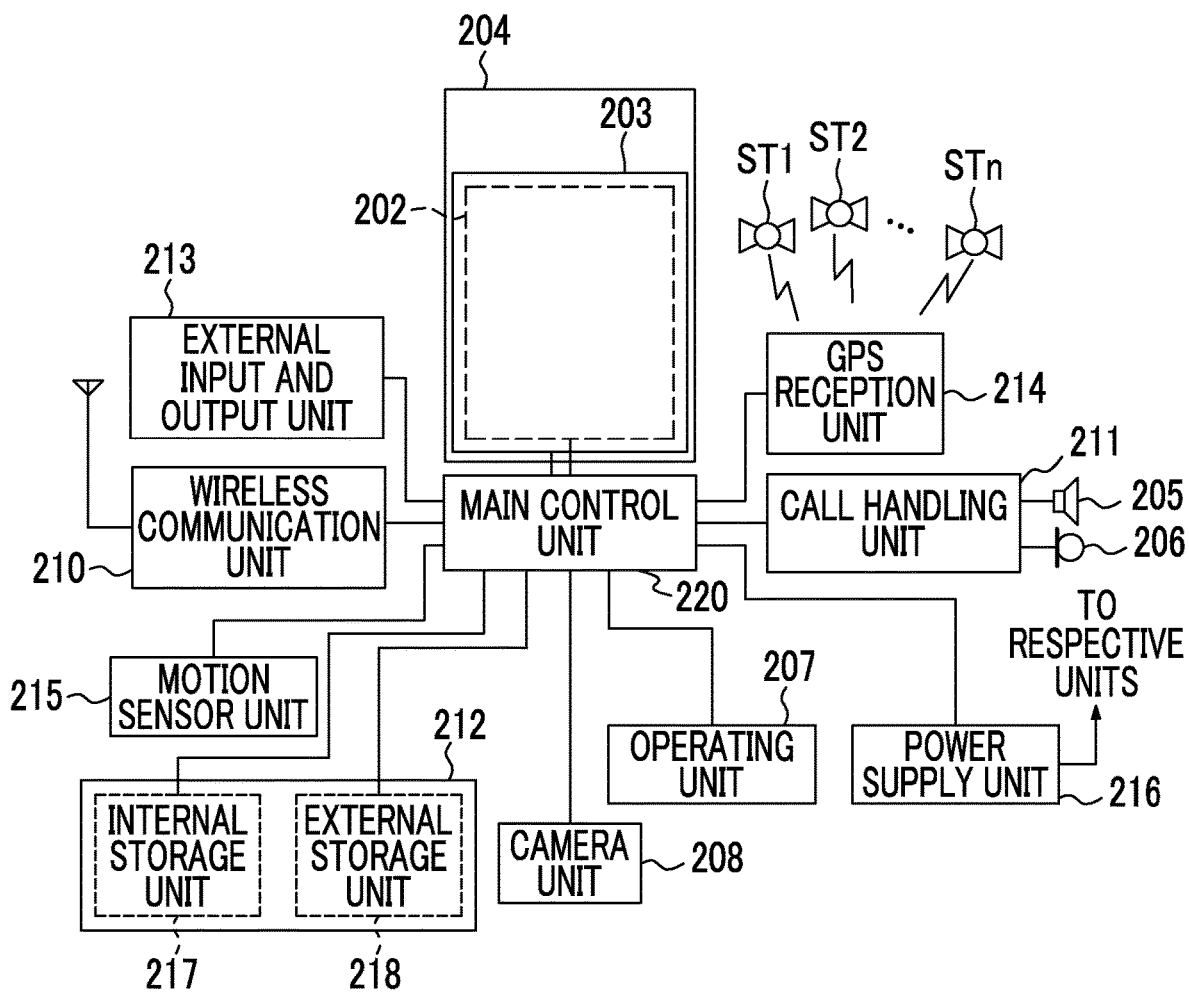
FIG. 20 is a block diagram showing a configuration of the smartphone 200 shown in FIG. 19.

FIG. 20 is a block diagram showing a configuration of the smartphone 200 shown in FIG. 19.

As shown in FIG. 20, the smartphone comprises, as main components, a wireless communication unit 210, the display input unit 204, a call handling unit 211, the operation unit 207, the camera unit 208, a storage unit 212, an external input and output unit 213, a Global Positioning System (GPS) reception unit 214, a motion sensor unit 215, a power supply unit 216, and a main controller 220.

The smartphone 200 has, as a main function, a wireless communication function of performing mobile wireless communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transfers the images and information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 20, although it has been described that the display panel 202 and the operation panel 203 of the smartphone 200 shown as the embodiment of the imaging device of the present invention are integrally formed and constitute the display input unit 204, the operation panel 203 is disposed to completely cover the display panel 202.

In a case where such an arrangement is adopted, the operation panel 203 may have a function of detecting the user operation even in a region outside the display panel 202. In other words, the operation panel 203 may comprise a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, and it is not necessary to match both the sizes.

The operation panel 203 may comprise the outer edge portion and two sensitive regions which are inner portions other than the outer edge portion. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 19, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user.

For example, as shown in FIG. 19, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone, and an external storage unit 218 having an external memory detachably attached via a slot.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or IEEE 1394) or a network (for example, Internet, wireless LAN, Bluetooth (registered trademark), radio frequency identification (RFID), Infrared Data Association (IrDA) (registered trademark), ultra wideband (UWB) (registered trademark), or ZigBee (registered trademark).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, or an earphone to be connected in a wired or wireless manner.

The external input and output unit 213 can transfer data transmitted from the external devices to the components in the smartphone 200 or can transmit data in the smartphone 200 to the external devices.

The GPS reception unit 214 receives GPS signals transmitted from GPS satellites ST1 to STn according to an instruction of the main controller 220, performs positioning calculation processing based on a plurality of received GPS signals, and detects the position of the smartphone 200 consisting of latitude, longitude, and altitude.

In a case where positional information can be acquired from the wireless communication unit 210 or the external input and output unit 213 (for example, a wireless LAN), the GPS reception unit 214 can detect the position by using the positional information.

For example, the motion sensor unit 215 comprises a three-axis acceleration sensor, and detects physical motion of the smartphone 200 according to an instruction of the main controller 220.

The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200.

The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212.

The application processing function is, for example, an infrared communication function of controlling the external input and output unit 213 to perform data communication with a device facing the smartphone, an e-mail function of transmitting and receiving e-mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating e-mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the aforementioned operations.

The camera unit 208 includes components other than the motion detection sensor 106, the system controller 108, and the image processing unit 107 of the digital camera 100 shown in FIG. 1.

In the smartphone 200, the main controller 220 controls the image shake correction device 3 based on information from the motion sensor unit 215 corresponding to the motion detection sensor 106 to perform image shake correction.

Captured image data generated by the camera unit 208 can be stored in the storage unit 212 or can be output through the external input and output unit 213 or the wireless communication unit 210.

Although it has been described in the smartphone 200 shown in FIG. 19 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS reception unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a motion picture may be attached with positional information acquired by the GPS reception unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

As described above, the following items are disclosed in this specification.

(1) An image shake correction device comprises a movable member to which an imaging element is fixed, a support member that supports the movable member in a movable manner in a plurality of directions including a first direction and a second direction perpendicular to each other along a light receiving surface of the imaging element, and a movement restriction unit that restricts a movement range of the movable member. The support member comprises a main body disposed on a side opposite to the light receiving surface side of the movable member, and a movement prevention member which has a portion which is fixed to the main body to interpose the movable member in cooperation with the main body and prevents movement of the movable member in a direction perpendicular to the light receiving surface by the portion, the movement restriction unit includes a hole portion which is formed in one of the movable member or the support member, and an insertion member which is formed in the other one of the movable member or the support member and is inserted into the hole portion, and the insertion member comprises an abutting portion which is located in the hole portion and is capable of entering a state in which the insertion member abuts on an inner surface of the hole portion and a state in which the insertion member does not abut on the inner surface by moving in the hole portion in the plurality of directions with the movement of the movable member, and a wide width portion which is disposed outside the hole portion on a side opposite to the other member side on which the insertion member is formed and of which a width in at least one direction along the light receiving surface is wider than the abutting portion, and the width of the wide width portion is narrower than a width of the hole portion in the at least one direction.

(2) In the image shake correction device according to (1), the other member in which the hole portion is formed further comprises a standing portion which stands from a surface on a side on which the wide width portion is disposed in a direction perpendicular to the surface and is formed along a periphery of the hole portion.

(3) In the image shake correction device according to (1) or (2), the at least one direction includes the first direction.

(4) In the image shake correction device according to (3), an end portion of the wide width portion on one side in the first direction is located so as to be closer to the one side than an end portion of the abutting portion on the one side in the first direction.

(5) In the image shake correction device according to (4), a position of an end portion of the wide width portion on the other side in the first direction is the same as a position of an end portion of the abutting portion on the other side in the first direction.

(6) In the image shake correction device according to (4) or (5), the movement prevention member includes a first portion formed along one of two sides of the light receiving surface in a longitudinal direction, a second portion formed along one side of the light receiving surface in a lateral direction, and a third portion formed along the other one of the two sides of the light receiving surface in the longitudinal direction, an overlapping area between the third portion and the movable member is smaller than an overlapping area between the first and second portions and the movable member, the first direction is the lateral direction, and the end portion of the wide width portion on the one side in the first direction is located at a position closer to the first portion than an end portion of the wide width portion on the other side in the first direction.

(7) In the image shake correction device according to any one of (1) to (6), the at least one direction further includes the second direction.

(8) An imaging device comprises the image shake correction device according to any one of (1) to (7).

Although various embodiments have been described with reference to the drawings, the present invention is not limited to such examples. It is clear that those skilled in the art can conceive various changes or modifications within the scope described in the claims, and it should be understood that these changes and modifications belong to the technical scope of the present invention. Each component in the aforementioned embodiment may be arbitrarily combined without departing from the spirit of the invention.

This application is based on a Japanese patent application filed on Dec. 28, 2017 (Japanese Patent Application No. 2017-254241), the contents of which are incorporated herein by reference.

The present invention is highly convenient and effective by being applied to a digital camera such as a single-lens reflex camera or a mirrorless camera, an in-vehicle camera, a surveillance camera, or a smartphone.

EXPLANATION OF REFERENCES

100: digital camera
101: imaging optical system
20: imaging element
3: image shake correction device
104: AFE
105: imaging element drive unit
106: motion detection sensor
108: system controller
107: image processing unit
K: optical axis
1: support member
1A: main body
1B: pressing member 1Ba: first portion
1Bb: second portion
1C: pressing member
1Ca, 1Cb, 1Cc: flat plate portion
1Cd: notch portion
Mh1: X-axis position detection magnet
Mh2: Y-axis rotation position detection magnet
Mh3: Y-axis rotation position detection magnet
1s, 2s, 3s: S-pole
1n, 2n, 3n: N-pole
Mv1: X-axis rotation drive magnet
Mv2: X-axis rotation drive magnet
Mv3: Y-axis drive magnet
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
24a, 24b, 24c: spring
20a: light receiving surface
P: center of light receiving surface
R: rotation axis
10: base
11a, 11b: hole portion
110a, 110b: standing portion
12, 14: yoke
13: coupling member
15a, 15b, 15c: flat surface
16a, 16b, 16c: hook
17a, 17b, 17c: projecting portion
18: yoke
19a: hole portion
19b, 19c: notch portion
21a, 21b, 21c: connector
22: base
23a, 23b, 23c: hook
25, 26, 27: flexible print substrate
25a, 26a: first portion
25b, 26b: folded portion
27a: fixed portion
27b: non-fixed portion
28A, 28A: attachment portion
28a, 28b: insertion member
280a, 280b: flat plate portion
281a, 281b: wide width portion
282a, 282b: shaft portion
283a, 283b: abutting portion
L1: distance
29a, 29b, 29c: bottom surface
290a, 290b, 290c: recess portion
200: smartphone
201: casing
202: display panel
203: operation panel
204: display input unit
205: speaker
206: microphone
207: operation unit
208: camera unit
210: wireless communication unit
211: call handling unit
212: storage unit
213: external input and output unit
214: GPS reception unit
215: motion sensor unit
216: power supply unit
217: internal storage unit
218: external storage unit
220: main controller
ST1 to STn: GPS satellites

What is claimed is:

1. An image shake correction device comprising:
a movable member to which an imaging element is fixed;
a support member that supports the movable member in a manner where the movable member is movable in a plurality of directions including a first direction and a second direction perpendicular to each other along a light receiving surface of the imaging element; and
a movement restriction unit that restricts a movement range of the movable member,
wherein the support member comprises
a main body disposed on a side opposite to the light receiving surface side of the movable member, and
a movement prevention member which has a portion which is fixed to the main body to interpose the movable member in cooperation with the main body and prevents movement of the movable member in a direction perpendicular to the light receiving surface by the portion,
the movement restriction unit includes
a hole portion which is formed at one of the movable member and the support member, and
an insertion member which is formed at the other one of the movable member and the support member and is inserted into the hole portion, and
the insertion member comprises
an abutting portion which is located in the hole portion and is capable of entering a state in which the insertion member abuts on an inner surface of the hole portion and a state in which the insertion member does not abut on the inner surface by moving in the hole portion in the plurality of directions with the movement of the movable member, and
a wide width portion which is disposed outside the hole portion on a side opposite to the other member side on which the insertion member is formed and of which a width in at least one direction along the light receiving surface is wider than the abutting portion, and
the width of the wide width portion is narrower than a width of the hole portion in the at least one direction.

2. The image shake correction device according to claim 1,
wherein the one of the movable member and the support member at which the hole portion is formed further comprises a standing portion along a periphery of the hole portion, the standing portion standing from a surface on a side on which the wide width portion is disposed in a direction perpendicular to the surface.

3. The image shake correction device according to claim 2,
wherein the at least one direction includes the first direction.

4. The image shake correction device according to claim 3,
wherein an end portion of the wide width portion on one side in the first direction is located so as to be closer to the one side in the first direction than an end portion of the abutting portion on the one side in the first direction.

5. The image shake correction device according to claim 4, wherein an end portion of the wide width portion on the other side in the first direction is located at a same position of an end portion of the abutting portion on the other side in the first direction.

6. The image shake correction device according to claim 5, wherein the movement prevention member includes
a first portion formed along one of two sides of the light receiving surface in a longitudinal direction,
a second portion formed along one side of the light receiving surface in a lateral direction, and
a third portion formed along another of the two sides of the light receiving surface in the longitudinal direction,
an overlapping area between the third portion and the movable member is smaller than an overlapping area between the first portion or the second portion and the movable member,
the first direction is the lateral direction, and
the end portion of the wide width portion on the one side in the first direction is located at a position closer to the first portion than an end portion of the wide width portion on the other side in the first direction.

7. The image shake correction device according to claim 4, wherein the movement prevention member includes
a first portion formed along one of two sides of the light receiving surface in a longitudinal direction,
a second portion formed along one side of the light receiving surface in a lateral direction, and
a third portion formed along another of the two sides of the light receiving surface in the longitudinal direction,
an overlapping area between the third portion and the movable member is smaller than an overlapping area between the first portion or the second portion and the movable member,
the first direction is the lateral direction, and
the end portion of the wide width portion on the one side in the first direction is located at a position closer to the first portion than an end portion of the wide width portion on the other side in the first direction.

8. The image shake correction device according to claim 1, wherein the at least one direction includes the first direction.

9. The image shake correction device according to claim 8, wherein an end portion of the wide width portion on one side in the first direction is located so as to be closer to the one side in the first direction than an end portion of the abutting portion on the one side in the first direction.

10. The image shake correction device according to claim 9, wherein an end portion of the wide width portion on the other side in the first direction is located at a same position of an end portion of the abutting portion on the other side in the first direction.

11. The image shake correction device according to claim 10, wherein the movement prevention member includes
a first portion formed along one of two sides of the light receiving surface in a longitudinal direction,
a second portion formed along one side of the light receiving surface in a lateral direction, and
a third portion formed along another of the two sides of the light receiving surface in the longitudinal direction,
an overlapping area between the third portion and the movable member is smaller than an overlapping area between the first portion or the second portion and the movable member,
the first direction is the lateral direction, and
the end portion of the wide width portion on the one side in the first direction is located at a position closer to the first portion than an end portion of the wide width portion on the other side in the first direction.

12. The image shake correction device according to claim 9, wherein the movement prevention member includes
a first portion formed along one of two sides of the light receiving surface in a longitudinal direction,
a second portion formed along one side of the light receiving surface in a lateral direction, and
a third portion formed along another of the two sides of the light receiving surface in the longitudinal direction,
an overlapping area between the third portion and the movable member is smaller than an overlapping area between the first portion or the second portion and the movable member,
the first direction is the lateral direction, and
the end portion of the wide width portion on the one side in the first direction is located at a position closer to the first portion than an end portion of the wide width portion on the other side in the first direction.

13. The image shake correction device according to claim 1, wherein the at least one direction further includes the second direction.

14. An imaging device comprising the image shake correction device according to claim 1.

* * * * *